(12) United States Patent
Wada et al.

(10) Patent No.: US 10,612,673 B2
(45) Date of Patent: Apr. 7, 2020

(54) GATE VALVE

(71) Applicant: ULVAC, INC., Chigasaki-shi (JP)

(72) Inventors: Shinichi Wada, Chigasaki (JP); Hideaki Inoue, Chigasaki (JP); Harukuni Furuse, Chigasaki (JP); Takuya Wade, Chigasaki (JP); Jirou Endo, Chigasaki (JP); Mikiya Suzuki, Chigasaki (JP); Shinnosuke Tokuhira, Chigasaki (JP)

(73) Assignee: ULVAC, INC., Chigasaki-shi (JP)

( * ) Notice: Subject to any disclaimer, the term of this patent is extended or adjusted under 35 U.S.C. 154(b) by 0 days.

(21) Appl. No.: 16/308,340

(22) PCT Filed: Oct. 3, 2017

(86) PCT No.: PCT/JP2017/035963
§ 371 (c)(1),
(2) Date: Dec. 7, 2018

(87) PCT Pub. No.: WO2018/066554
PCT Pub. Date: Apr. 12, 2018

(65) Prior Publication Data
US 2019/0211935 A1  Jul. 11, 2019

(30) Foreign Application Priority Data

Oct. 4, 2016 (JP) ................. 2016-196454

(51) Int. Cl.
*F16K 3/10* (2006.01)
*F16K 3/18* (2006.01)
(Continued)

(52) U.S. Cl.
CPC .................. *F16K 3/10* (2013.01); *F16K 3/06* (2013.01); *F16K 3/18* (2013.01); *F16K 51/02* (2013.01)

(58) Field of Classification Search
CPC ..... F16K 3/10; F16K 3/06; F16K 3/18; F16K 51/02
See application file for complete search history.

(56) References Cited

U.S. PATENT DOCUMENTS 5,271,426 A * 12/1993 Clarkson ............... F16K 3/0281
  137/375
5,577,707 A * 11/1996 Brida ........................ F16K 3/20
  251/159

(Continued)

FOREIGN PATENT DOCUMENTS

CN         1209517       3/1999
CN       101675279       3/2010
(Continued)

OTHER PUBLICATIONS

Office Action from related Chinese Application No. 201780043577.2, dated May 15, 2019. English translation of the Search Report is attached.

(Continued)

*Primary Examiner* — Matthew W Jellett
*Assistant Examiner* — Christopher D Ballman
(74) *Attorney, Agent, or Firm* — Grossman, Tucker, Perreault & Pfleger, PLLC

(57) ABSTRACT

A gate valve of the invention includes a valve box, a neutral valve body, and a rotation shaft. The neutral valve body includes a neutral valve and a movable valve. The movable valve includes a first movable valve and a second movable valve. The gate valve includes a plurality of first force-applying units, a second force-applying unit, and a third force-applying unit. The third force-applying unit applies a force to the first movable valve. The first force-applying units apply a force to the first movable valve and thereby causing the seal portion to be in close contact with a valve box inner surface located at a periphery of the first opening (Continued)

portion. The second force-applying unit drives the first movable valve and the second movable valve so that thicknesses thereof in the flow passage direction are adjustable.

5 Claims, 22 Drawing Sheets

(51) Int. Cl.
*F16K 51/02* (2006.01)
*F16K 3/06* (2006.01)

(56) References Cited

U.S. PATENT DOCUMENTS

| | | | | |
|---|---|---|---|---|
| 6,016,299 | A * | 1/2000 | Ishige | G11B 33/08 |
| | | | | 720/621 |
| 6,026,856 | A | 2/2000 | Miyazoe et al. | |
| 6,089,537 | A | 7/2000 | Olmsted | |
| 6,854,708 | B2 * | 2/2005 | Contin | F16K 51/02 |
| | | | | 251/167 |
| 6,863,256 | B2 * | 3/2005 | Lucas | F16K 3/06 |
| | | | | 251/159 |
| 7,413,162 | B2 | 8/2008 | Geiser | |
| 7,654,505 | B2 * | 2/2010 | Schoen | F16K 3/10 |
| | | | | 251/175 |
| 7,739,704 | B2 * | 6/2010 | Wada | G11B 17/051 |
| | | | | 720/695 |
| 7,871,061 | B1 * | 1/2011 | Mandeville, Jr. | F16K 3/04 |
| | | | | 251/169 |
| 8,099,743 | B2 * | 1/2012 | Wada | G11B 17/028 |
| | | | | 720/691 |
| 8,434,511 | B2 * | 5/2013 | Williams | F16K 3/06 |
| | | | | 137/340 |
| 8,733,734 | B2 * | 5/2014 | Nakamura | F16K 1/2085 |
| | | | | 251/174 |
| 9,752,688 | B2 * | 9/2017 | Travnicek | F16K 3/18 |
| 9,976,655 | B2 * | 5/2018 | Ehrne | F16K 51/02 |
| 10,012,316 | B2 * | 7/2018 | Taguchi | F16K 3/0227 |
| 2002/0150020 | A1 * | 10/2002 | Mizoguchi | G11B 17/0284 |
| | | | | 720/691 |
| 2005/0286359 | A1 * | 12/2005 | Ezawa | G11B 17/0283 |
| | | | | 369/44.37 |
| 2009/0127487 | A1 * | 5/2009 | Iwabuchi | F16K 39/045 |
| | | | | 251/193 |
| 2010/0132891 | A1 | 6/2010 | Nozawa | |
| 2011/0048563 | A1 | 3/2011 | Negishi et al. | |
| 2012/0161055 | A1 | 6/2012 | Nakamura et al. | |

FOREIGN PATENT DOCUMENTS

| | | |
|---|---|---|
| CN | 101960190 | 1/2011 |
| CN | 102575779 | 7/2012 |
| JP | 3425938 | 7/2003 |
| JP | 2004-108471 | 4/2004 |
| JP | 3655715 | 6/2005 |
| JP | 2011-137537 | 7/2011 |
| JP | 2013-032840 | 2/2013 |
| JP | 5613087 | 10/2014 |
| JP | 2015-113951 | 6/2015 |
| TW | 200424465 | 11/2004 |

OTHER PUBLICATIONS

Office Action from related Korean Application No. 10-2019-7000718, dated Apr. 22, 2019. English translation attached.
International Search Report from corresponding PCT Application No. PCT/JP2017/035963 dated Dec. 12, 2017. English translation attached.
Office Action from related Taiwanese Application No. 106134236, dated Jan. 8, 2019. English translation of the Search Report is attached.
Notice of Allowance from related Chinese Application No. 201780043577.2, dated Sep. 30, 2019. English translation is attached.

* cited by examiner

GATE VALVE

TECHNICAL FIELD

The present invention relates to a gate valve which is suitable for use in a pendulum valve, a direct acting valve, or the like, which slidably operates a valve body in addition to operation of opening and closing a flow passage using the valve body (valve plate). Particularly, the invention relates to a gate valve which isolates (closes) a flow passage that connects two spaces having pressures different from each other and isolates a flow passage that connects two spaces carrying out processings different from each other in a vacuum apparatus or the like and which releases this isolated state (communicates the two spaces).

This application claims priority from Japanese Patent Application No. 2016-196454 filed on Oct. 4, 2016, the contents of which are incorporated herein by reference in their entirety.

BACKGROUND ART

Gate valves are provided in a vacuum apparatus or the like, and the gate valves separate two spaces in which the vacuum degrees thereof are different from each other such as between a chamber and pipes, between pipes, between a pipe and a pump, or the like; and the gate valves communicate the two spaces. As such a gate valve, various valves are known.

For example, a structure is known in which a valve plate is inserted into a valve opening-closing position of a flow passage by sliding a valve plate, furthermore, the flow passage is separated (valve closing operation) or flow passages are communicated by operating the aforementioned valve plate (valve opening operation) by operating this valve plate. Additionally, the valve plate is moved to a safety position located in a valve box from the flow passage by sliding the valve plate. As a valve having such a structure, a pendulum valve, a direct acting valve, a door valve, or the like is known.

A direct acting gate valve has a constitution in which a valve plate is disposed in a hollow portion of a valve box. A first opening portion and a second opening portion constituting a flow passage are formed at the valve box. The valve plate is securely fixed to a valve rod (support body). In this structure, the aforementioned valve plate is inserted into the valve opening-closing position of the opening portion (flow passage) by moving straight the aforementioned valve rod in the longitudinal direction thereof, or the aforementioned valve plate is moved to the safety position at which the opening portion is not formed.

As a conventional direct acting gate valve, a gate valve is known which is provided with a valve body that is configured to include two of a first valve plate and a second valve plate which are connected to each other with bellows interposed therebetween, an actuator be disposed at the center portion of the valve plate between these two valve plates, and a valve box at which an opening portion constituting the flow passage is formed. In this gate valve, the flow passage is closed due to the first valve plate coming in contact with and pressing onto the peripheral inner surface of the opening portion of the valve box by operating the actuator, or the flow passage is released due to separating the first valve plate from the inner surface of the aforementioned valve box by operating the actuator (for example, refer to Patent Document 1).

Additionally, a pendulum gate valve has a constitution in which a valve box having a hollow portion, a support body, and a valve body (a valve plate in the case of the structure in which a seal ring plate is provided at an opening portion) which is securely fixed to this support body. In the valve box, a first opening portion and a second opening portion constituting a flow passage are formed. The support body is securely fixed to a rotation shaft in the hollow portion and is expanded in a direction parallel to the plane perpendicular to the rotation shaft. In this gate valve, the aforementioned valve body is turned by rotating the aforementioned rotation shaft, therefore, the above-described valve body is inserted into the valve opening-closing position of the opening portion (flow passage) or the above-described valve body is moved to the safety position at which the opening portion is not formed.

As a conventional pendulum gate valve, a constitution is known in which a valve plate that is capable of rotating around a rotation shaft in a hollow portion of a housing, a slidable seal ring plate that is disposed at an opening portion of the housing, and an actuator allowing the aforementioned seal ring plate to slide on a flange formed integrally with the housing are provided. In this gate valve, the flow passage is closed due to the aforementioned seal ring plate coming in contact with and pressing onto the aforementioned valve plate, or the flow passage is released by separating the aforementioned seal ring plate from the aforementioned valve plate (for example, refer to Patent Document 2).

The actuator provided in this pendulum gate valve has a structure in which a bolt, a ring-shaped chamber (cylinder), a piston, and a spring are arranged in series in the sliding direction of the seal ring plate. For this reason, when the flow passage is being closed, the restorative force generated in the spring is transmitted to the seal ring plate through the piston, the cylinder, and the bolt.

As such a pendulum gate valve, a valve is disclosed which airtightly blocks a flow passage, has degree of abrasion resistance, and is ease in maintenance (for example, refer to Patent Document 3). In this gate valve, an outer valve body is connected to a drive unit via an arm, and the outer valve body vertically moves in an opening axis. Consequently, an activation device which prompts the arm to vertically move via a power transmission device needs a considerable driving power depending on an increase in a surface area of the gate valve.

Additionally, in the case of applying the configuration disclosed in Patent Document 3 to a large-scale gate valve, in addition to that the volume of an O-ring that is to be pressed increases, the O-ring is disposed at a position distant from the rotation shaft. Because of this, since it is required to design the rotation shaft so as to become a rigid body that bears against a necessary moment load, it contributes to an increase in a weight of the gate valve.

Accordingly, although the configuration disclosed in Patent Document 3 is effective to a small gate valve, it is unsuitable for a large-scale gate valve.

The inventors have developed a gate valve having a configuration which can increase a surface area of the aforementioned gate valve and can carry out isolation operation with a high degree of reliability by a simple configuration, and filed a patent application (Patent Document 4). In this gate valve, a movable valve that forms a valve body is configured to include a plurality of movable valves in a stacking direction (for example, a movable valve frame (first movable valve), a movable valve plate (second movable valve)), and an air cylinder (second force-applying unit) is provided at a position at which both movable valves are connected. In order to drive the air cylinder, it has been necessary to provide, inside the movable valve frame (first movable valve), a line (supply line) that extends from the outside of the gate valve to the air cylinder through the rotation shaft of the gate valve and introduces compressed air thereinto.

In the valve body structure in which the air cylinder or the supply line are provided inside the gate valve as stated above, although isolation operation with a high degree of reliability can be realized, a weight of the valve body increases, a large driving power is necessary when the valve body moves upward and downward or the valve body moves while revolving, and therefore simplification of the configuration of the valve body and weight saving thereof have been required.

Moreover, in the mechanism including an air cylinder inside the valve body, in the case where the proportion of the surface area receiving a pressure to the valve body is, for example, 25%, the cancellation rate of a back pressure is approximately 75%, a large sealing force tends to be required. Consequently, development of an excellent back pressure cancellation mechanism has been expected. Here, the back pressure means that a pressure is applied to a valve body in a direction from a valve closed state to a valve opened state, and a back pressure cancellation mechanism means a mechanism that does not directly oppose the back pressure (a mechanism that does not generates a back pressure).

PRIOR ART DOCUMENTS

Patent Documents (Patent Document 1) Japanese Patent No. 3425938
(Patent Document 2) Japanese Patent No. 3655715
(Patent Document 3) Japanese Unexamined Patent Application, First Publication No. 2013-32840
(Patent Document 4) Japanese Patent No. 5613087

SUMMARY OF THE INVENTION

Problems to be Solved by the Invention

The invention was made with respect to the above-described conventional situation, and has an object to provide a gate valve that can carry out isolation operation with a high degree of reliability, achieves a weight saving of a movable valve, and can realize 100% of a back pressure cancellation rate.

Means for Solving the Problems

In order to solve the aforementioned problems, a gate valve according to a first aspect of the invention includes: a valve box having a hollow portion, a first opening portion, and a second opening portion, the first opening portion and the second opening portion being provided so as to face each other with the hollow portion interposed therebetween and forming a flow passage passing through the hollow portion; a neutral valve body that is arranged in the hollow portion of the valve box and is capable of sealing the first opening portion; and a rotation shaft that functions as a position switcher that drives the neutral valve body between a valve sealing position at which the neutral valve body is in a state of sealing the first opening portion and a valve opening position at which the neutral valve body is in an open state of being retracted from the first opening portion, the rotation shaft having an axis line extending in a flow passage direction. The neutral valve body includes: a neutral valve connected to the position switcher; and a movable valve connected to the neutral valve so that a position thereof with respect to the neutral valve in the flow passage direction is changeable. The movable valve includes a first movable valve and a second movable valve, the first movable valve includes a seal portion that is provided thereon, is circumferentially provided on the movable valve, and is to be in close contact with a valve box inner surface located at a periphery of the first opening portion, the first movable valve is connected to the neutral valve so that a position thereof with respect to the neutral valve in the flow passage direction is changeable, and the second movable valve is slidable relative to the first movable valve in the flow passage direction. The gate valve according to the first aspect of the invention includes: a plurality of first force-applying units built in the valve box; a second force-applying unit disposed between the first movable valve and the second movable valve (built in the movable valve); and a third force-applying unit. The third force-applying unit causes the first movable valve to connect the neutral valve so that a position thereof with respect to the neutral valve in the flow passage direction is changeable, and the third force-applying unit applies a force to the first movable valve to be directed to a center position in the flow passage direction. The first force-applying units have a function of applying a force to the first movable valve to be directed to the first opening portion in the flow passage direction and thereby causing the seal portion to be in close contact with a valve box inner surface located at a periphery of the first opening portion. The second force-applying unit drives the first movable valve and the second movable valve so that thicknesses thereof in the flow passage direction are adjustable.

In the gate valve according to the first aspect of the invention, each of the first force-applying units may be disposed at a position at which the first force-applying unit acts with respect to the first movable valve in the valve box and may be provided along the first movable valve.

In the gate valve according to the first aspect of the invention, the first force-applying units may apply tensile force to the first movable valve.

In the gate valve according to the first aspect of the invention, the first force-applying units may apply compressive force to the first movable valve.

In the gate valve according to the first aspect of the invention, the third force-applying unit may be a plate spring.

In order to solve the aforementioned problems, a gate valve according to a second aspect of the invention includes: a valve box having a hollow portion, a first opening portion, and a second opening portion, the first opening portion and the second opening portion being provided so as to face each other with the hollow portion interposed therebetween and forming a flow passage passing through the hollow portion; a neutral valve body that is arranged in the hollow portion of the valve box and is capable of sealing the first opening portion; and a rotation shaft that functions as a position switcher that drives the neutral valve body between a valve sealing position at which the neutral valve body is in a state of sealing the first opening portion and a valve opening position at which the neutral valve body is in an open state of being retracted from the first opening portion, the rotation shaft having an axis line extending in a flow passage direction. The neutral valve body includes: a neutral valve connected to the position switcher; and a movable valve connected to the neutral valve so that a position thereof with respect to the neutral valve in the flow passage direction is changeable. The movable valve includes a first movable valve and a second movable valve, the first movable valve includes a seal portion that is provided thereon, is circumferentially provided on the movable valve, and is to be in close contact with a valve box inner surface located at a periphery of the first opening portion, the first movable valve is connected to the neutral valve so that a position thereof with respect to the neutral valve in the flow passage direction is changeable, and the second movable valve is slidable relative to the first movable valve in the flow passage direction. In the gate valve according to the second aspect of the invention, the gate valve includes: a plurality of first force-applying units built in the valve box; and a second force-applying unit disposed between the first movable valve and the second movable valve (built in the movable valve). The first force-applying units have: a function of applying a force to the first movable valve to be directed to the first opening portion in the flow passage direction and thereby causing the seal portion to be in close contact with a valve box inner surface located at a periphery of the first opening portion, and the second force-applying unit that has a function of causing the first movable valve to connect the neutral valve so that a position thereof with respect to the neutral valve in the flow passage direction is changeable and applying a force to the first movable valve to be directed to a center position in the flow passage direction drives the first movable valve and the second movable valve so that thicknesses thereof in the flow passage direction are adjustable.

Effects of the Invention

In the gate valve according to the first aspect of the invention, the movable valve disposed inside the hollow portion of the valve box is configured to include the first movable valve and the second movable valve. The gate valve has a valve structure that includes: a first movable valve; a second movable valve that is fitted into the first movable valve in a state of being slidable and sealable with respect to the first movable valve in the axial direction; and a neutral valve body that holds the first movable valve via a second force-applying unit.

Additionally, the gate valve according to the first aspect of the invention includes a third force-applying unit that connects the first movable valve to the neutral valve so that a position thereof with respect to the neutral valve in the flow passage direction is changeable and applies a force to the first movable valve to be directed to a center position in the flow passage direction.

Furthermore, the gate valve according to the first aspect of the invention includes a first force-applying unit that is provided inside the valve box, presses the first movable valve in a direction toward a sealing face of a valve box inner surface, and constitutes a lifting and lowering mechanism capable of extending and contracting.

According to this configuration, since the structure is obtained in which the valve body is configured to include two of the first movable valve and the second movable valve and two of the second force-applying unit and the third force-applying unit and another first force-applying unit is built in the valve box, weight saving of the valve structure by the weight of the first force-applying unit is achieved.

In the gate valve according to the first aspect of the invention, the first force-applying unit works in the case where the gate valve becomes in the valve closed state from the valve opened state, and adversely the third force-applying unit works in the case where the gate valve becomes in the valve opened state from the valve closed state.

In addition, according to the second aspect of the invention, it is possible to achieve the configuration in which the first force-applying unit also has the function of the third force-applying unit. Consequently, since weight saving of the valve structure is further achieved, it is more preferable.

In the conventional gate valve, the valve structure includes the air cylinder, a supply line is necessary which introduces compressed air into the air cylinder, and therefore the valve structure thereof was complicated. In contrast, the first force-applying unit according to the above-mentioned aspects of the invention is disposed inside the valve box, but is not included in the valve structure, and therefore results in simplification of the valve structure.

Moreover, in the gate valve according to the above-mentioned aspects of the invention, as the configuration is adopted in which the first force-applying unit is provided inside the valve box, since the valve box can receive reactive force of the O-ring to be pressed in the gate valve, the rigid body that forms the rotation shaft and the neutral valve can be designed without consideration of the reactive force of the O-ring. This contributes weight saving of the valve structure.

In the conventional gate valve, an air cylinder having a back pressure cancellation rate of approximately 75% is used. In contrast, according to the aspects of the invention, since the first force-applying unit is adopted which constitutes the lifting and lowering mechanism pressing the first movable valve in the direction toward the sealing face, 100% of a back pressure cancellation rate is obtained.

As a result, in the gate valve according to the above-mentioned aspects of the invention, it is possible to provide a gate valve that can carry out isolation operation with a high degree of reliability, achieves a weight saving of a movable valve, and can realize 100% of a back pressure cancellation rate.

EMBODIMENTS FOR CARRYING OUT THE INVENTION

Figure 1:
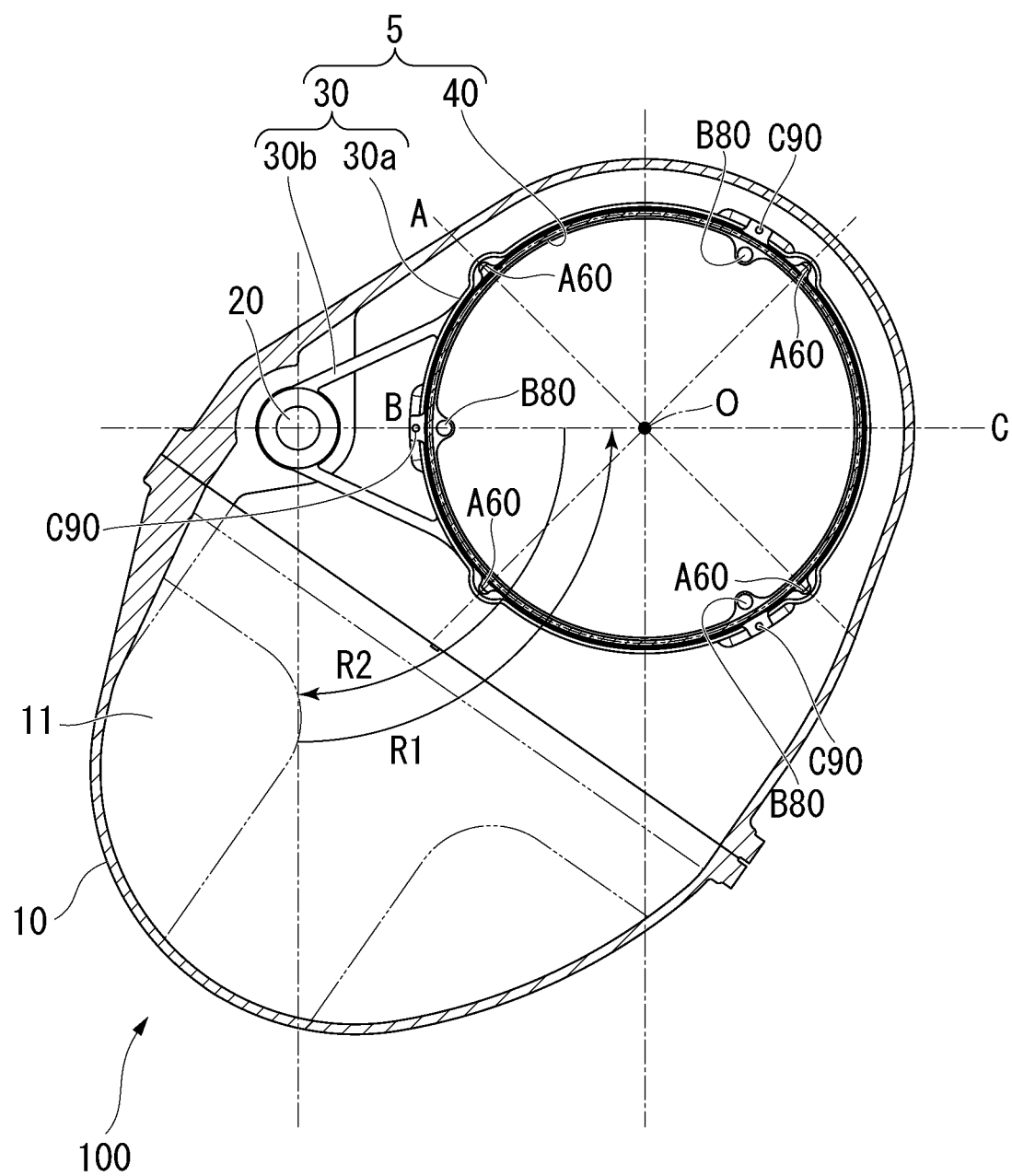
FIG. 1 is a horizontal cross-sectional view showing a configuration of a gate valve according to an embodiment of the invention.

Hereinafter, a gate valve according to an embodiment the invention will be described with reference to drawings.

In the drawings used for explanation described below, in order for the respective components to be of understandable size in the drawings, the dimensions and the proportions of the components are modified as needed compared with the real components.

The technical scope of the invention is not limited to the embodiments which will be described below, but various modifications may be made without departing from the scope of the invention.

In the embodiment, a movable valve A (A60) corresponds to a first movable valve of the invention, and a movable valve B (B50) corresponds to a second movable valve. Additionally, a force-applying unit A (A70) corresponds to a first force-applying unit of the invention, a force-applying unit B (B80) corresponds to a second force-applying unit of the invention, and a force-applying unit C (C90) corresponds to a third force-applying unit of the invention.

Embodiment

FIG. 1 is a plan view showing a configuration of the gate valve according to the embodiment.

Figure 2:
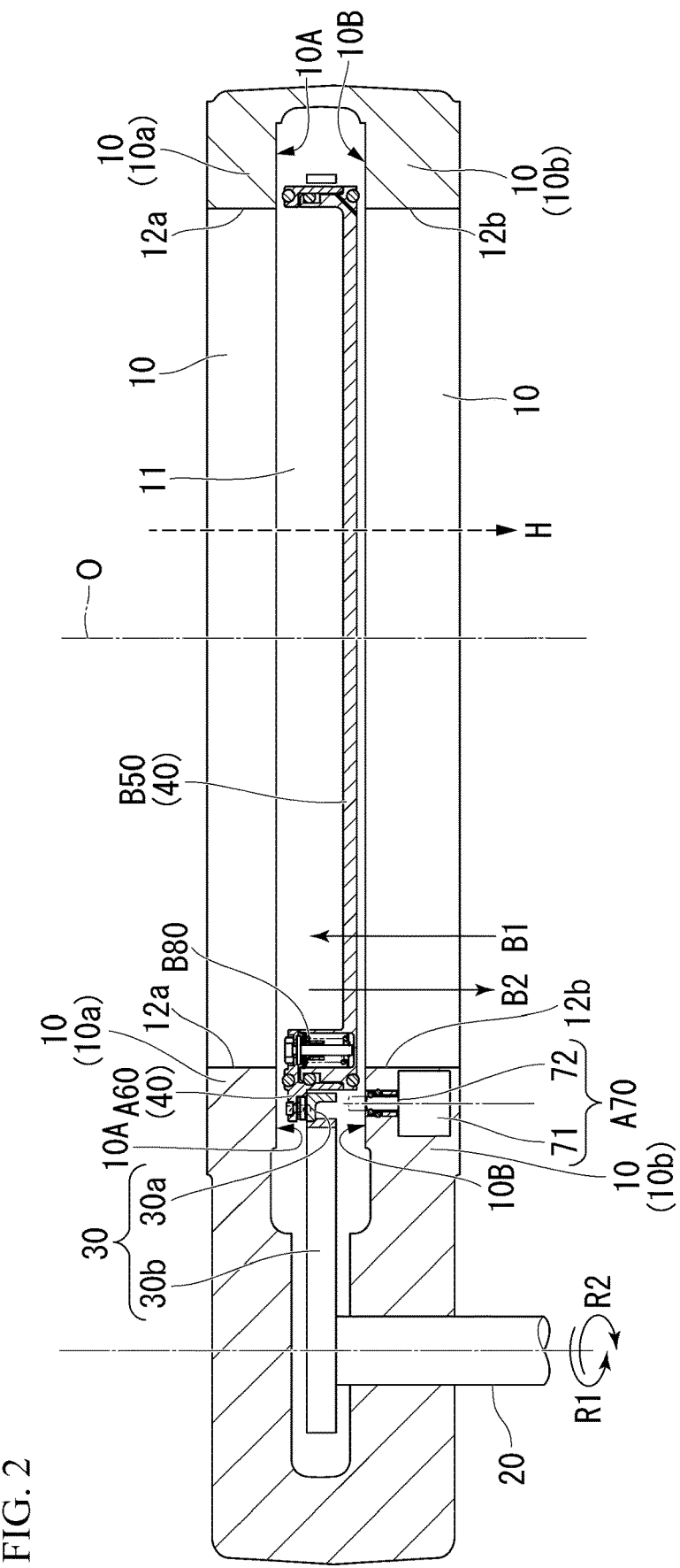
FIG. 2 is a vertical cross-sectional view showing the configuration of the gate valve according to the embodiment of the invention and is a view showing a case where a valve body is disposed at a position (FREE) at which a retraction operation can be carried out.

FIG. 2 is a vertical cross-sectional view showing the configuration of the gate valve according to the embodiment and is a view showing a case where the valve body is disposed at a position (FREE) at which a retraction operation can be carried out. FIG. 2 corresponds to the line segment B-O-C shown in FIG. 1. Similar to FIG. 2, FIGS. 3 to 6 are views showing a case where the valve body is disposed at a position (FREE) at which a retraction operation can be carried out.

Figure 3:
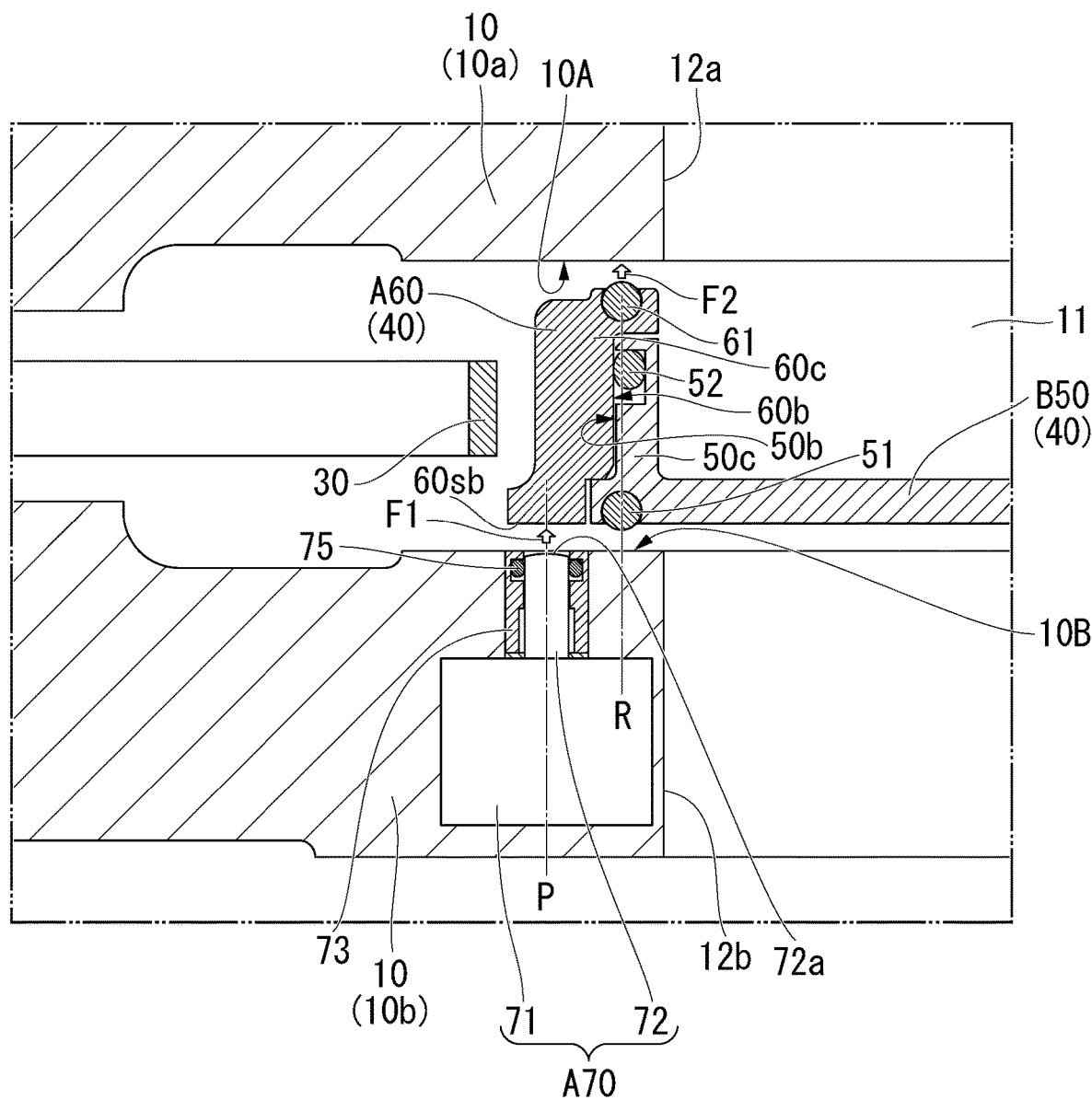
FIG. 3 is an enlarged view showing relevant part taken along the line segment A-O shown in FIG. 1 and is a view showing a case where the valve body is disposed at a position (FREE) at which a retraction operation can be carried out.

FIG. 3 is an enlarged view showing relevant part taken along the line segment A-O shown in FIG. 1 and is a view showing configurations of members located close to the force-applying unit A that is built in the valve box.

Figure 4:
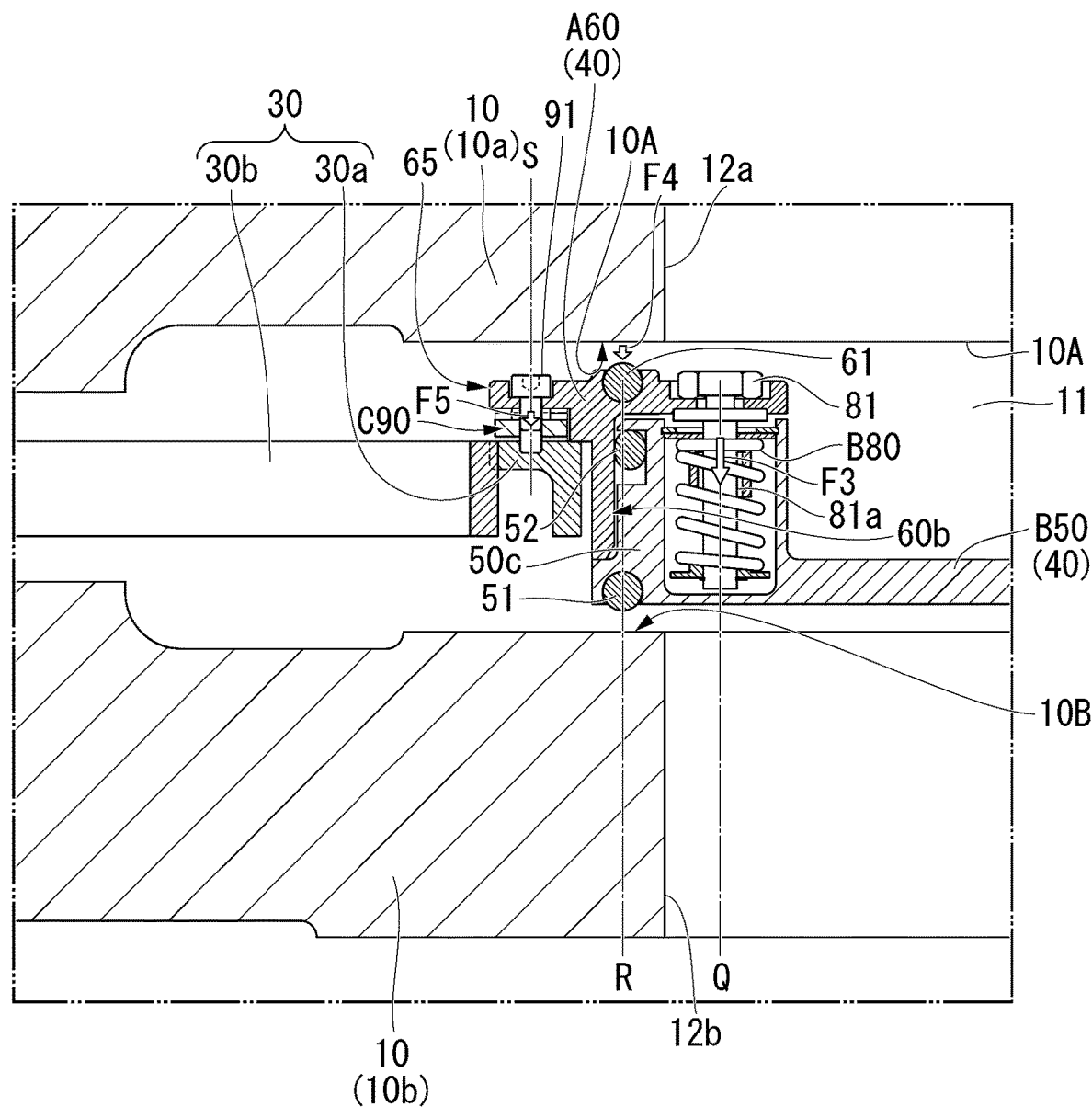
FIG. 4 is an enlarged view showing relevant part taken along the line segment B-O shown in FIG. 1 and is a view showing a case where the valve body is disposed at a position (FREE) at which a retraction operation can be carried out.

FIG. 4 is an enlarged view showing relevant part taken along the line segment B-O shown in FIG. 1 and is a view showing configurations of members located close to the force-applying unit B disposed between the movable valve A and the movable valve B.

Figure 5:
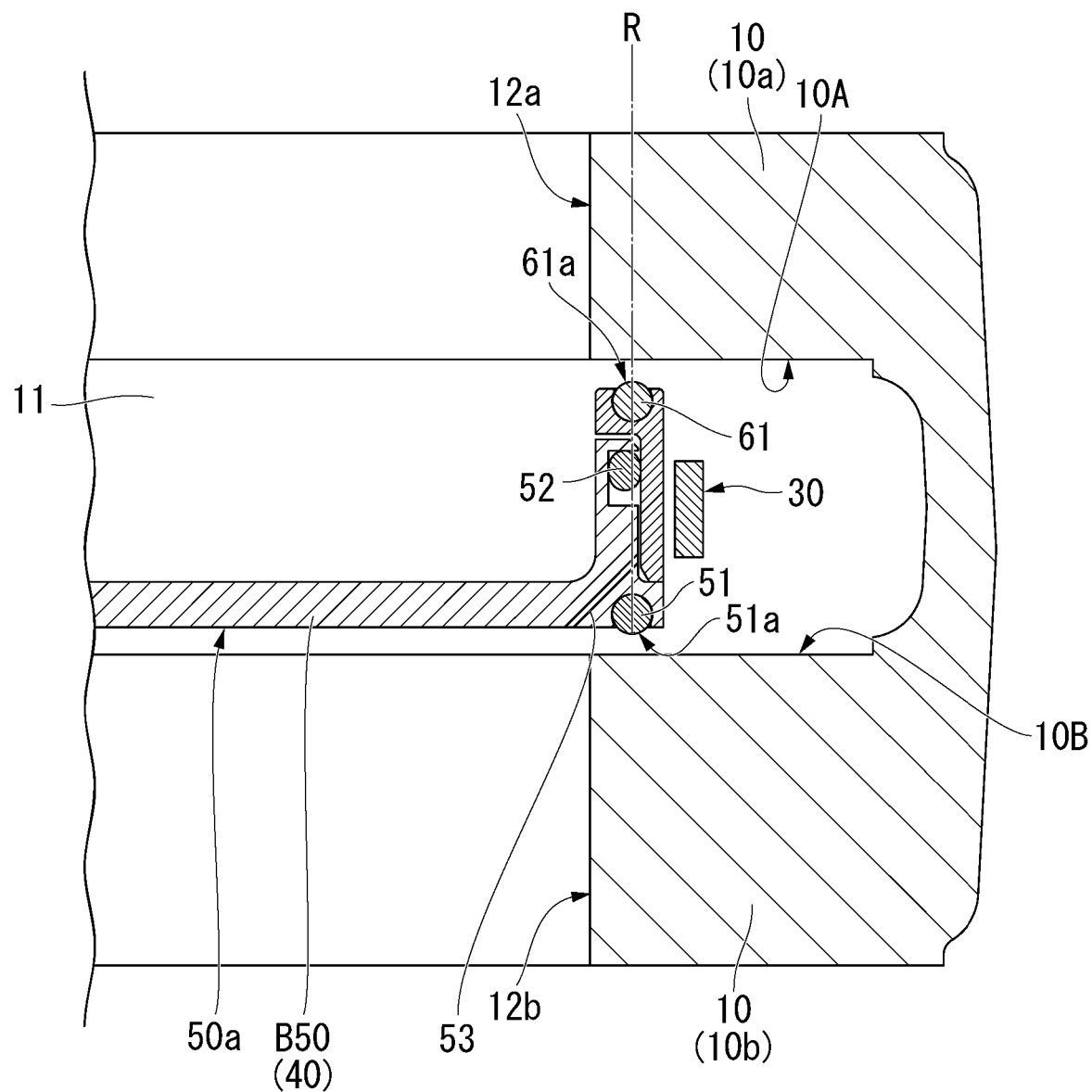
FIG. 5 is an enlarged view showing relevant part taken along the line segment C-O shown in FIG. 1 and is a view showing a case where the valve body is disposed at a position (FREE) at which a retraction operation can be carried out.

FIG. 5 is an enlarged view showing relevant part taken along the line segment C-O shown in FIG. 1 and is a view showing the movable valve A and the movable valve B at a position at which the force-applying unit A and the force-applying unit B are not present.

Figure 6:
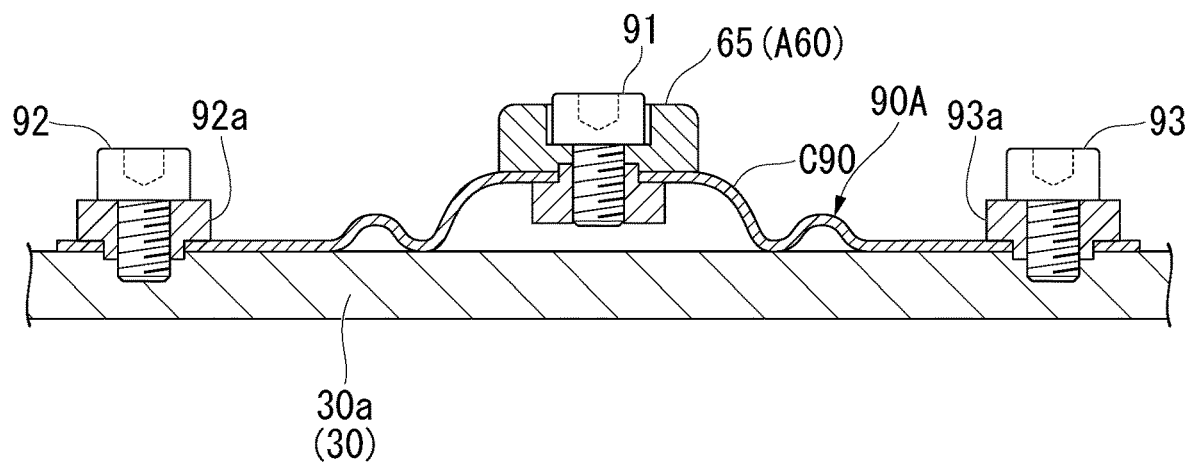
FIG. 6 is an enlarged view showing relevant part of a force-applying unit C shown in FIG. 2 and is a view showing a case where the valve body is disposed at a position (FREE) at which a retraction operation can be carried out.

FIG. 6 is an enlarged view showing relevant part of the force-applying unit C shown in FIG. 1 and is a view showing the force-applying unit C as seen in the paperface depth direction in FIG. 2.

Figure 7:
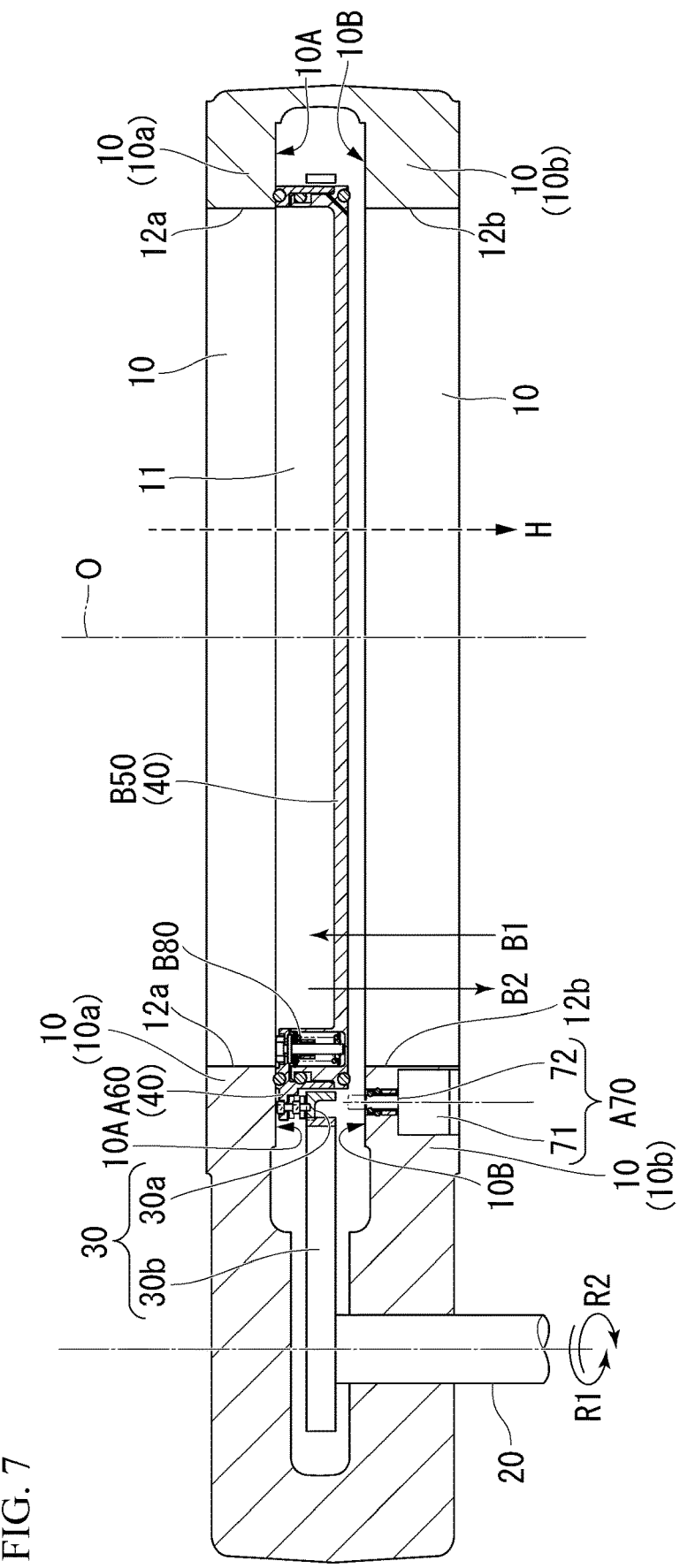
FIG. 7 is a vertical cross-sectional view showing the configuration of the gate valve according to the embodiment of the invention and is a view showing a case where the valve body is disposed at a valve closing position (positive pressure or non-differential pressure).

FIG. 7 is a vertical cross-sectional view showing the configuration of the gate valve according to the embodiment and is a view showing a case where the valve body is disposed at a valve closing position (positive pressure or non-differential pressure). FIG. 7 corresponds the line segment B-O-C shown in FIG. 1. Similar to FIG. 7, FIGS. 8 to 11 are views showing a case where the valve body is disposed at a valve closing position (positive pressure or non-differential pressure).

Figure 8:
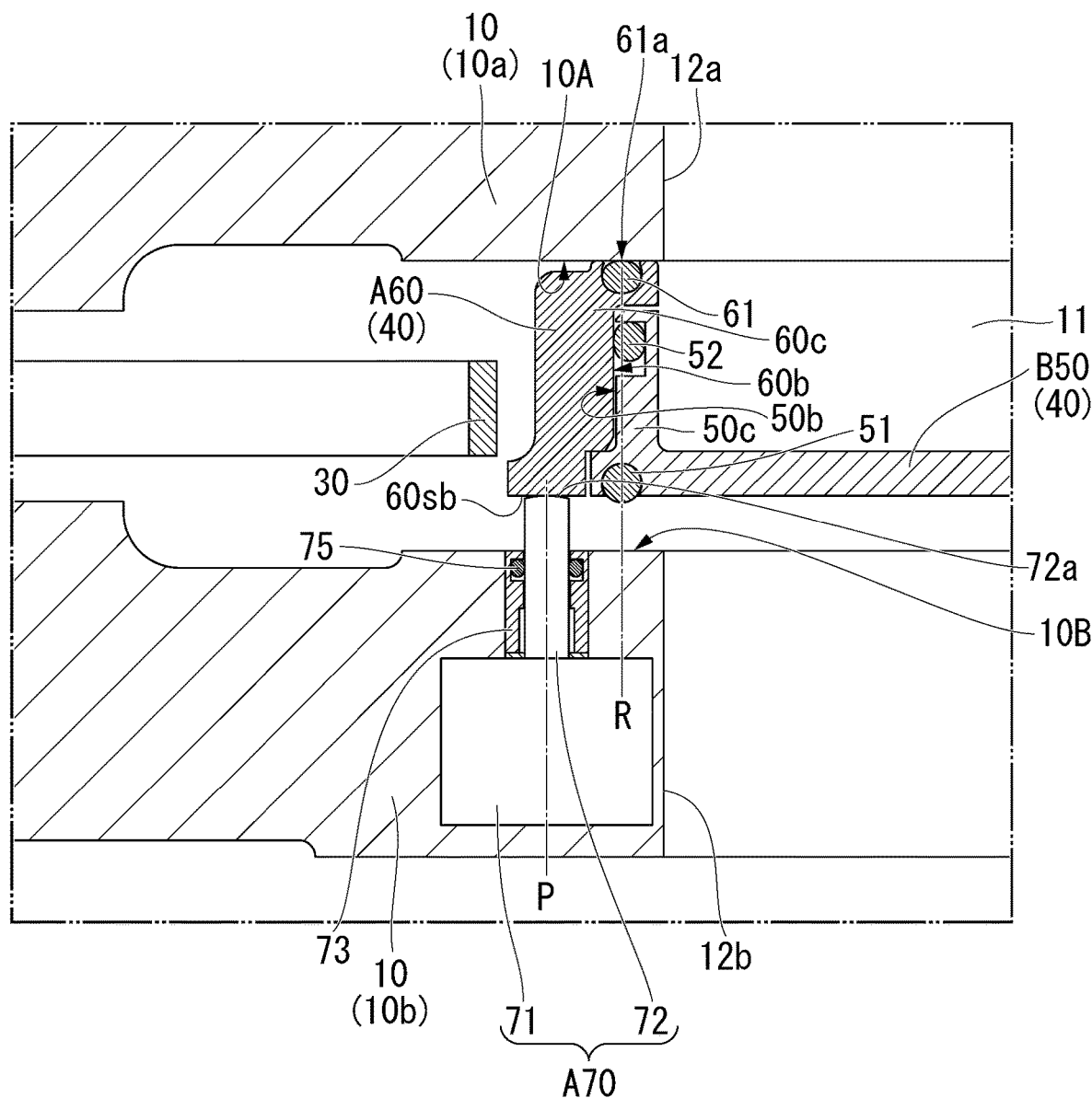
FIG. 8 is an enlarged view showing relevant part taken along the line segment A-O shown in FIG. 1 and is a view showing a case where the valve body is disposed at a valve closing position (positive pressure or non-differential pressure).

FIG. 8 is an enlarged view showing relevant part taken along the line segment A-O shown in FIG. 1 and is a view showing configurations of members located close to the force-applying unit A that is built in the valve box.

Figure 9:
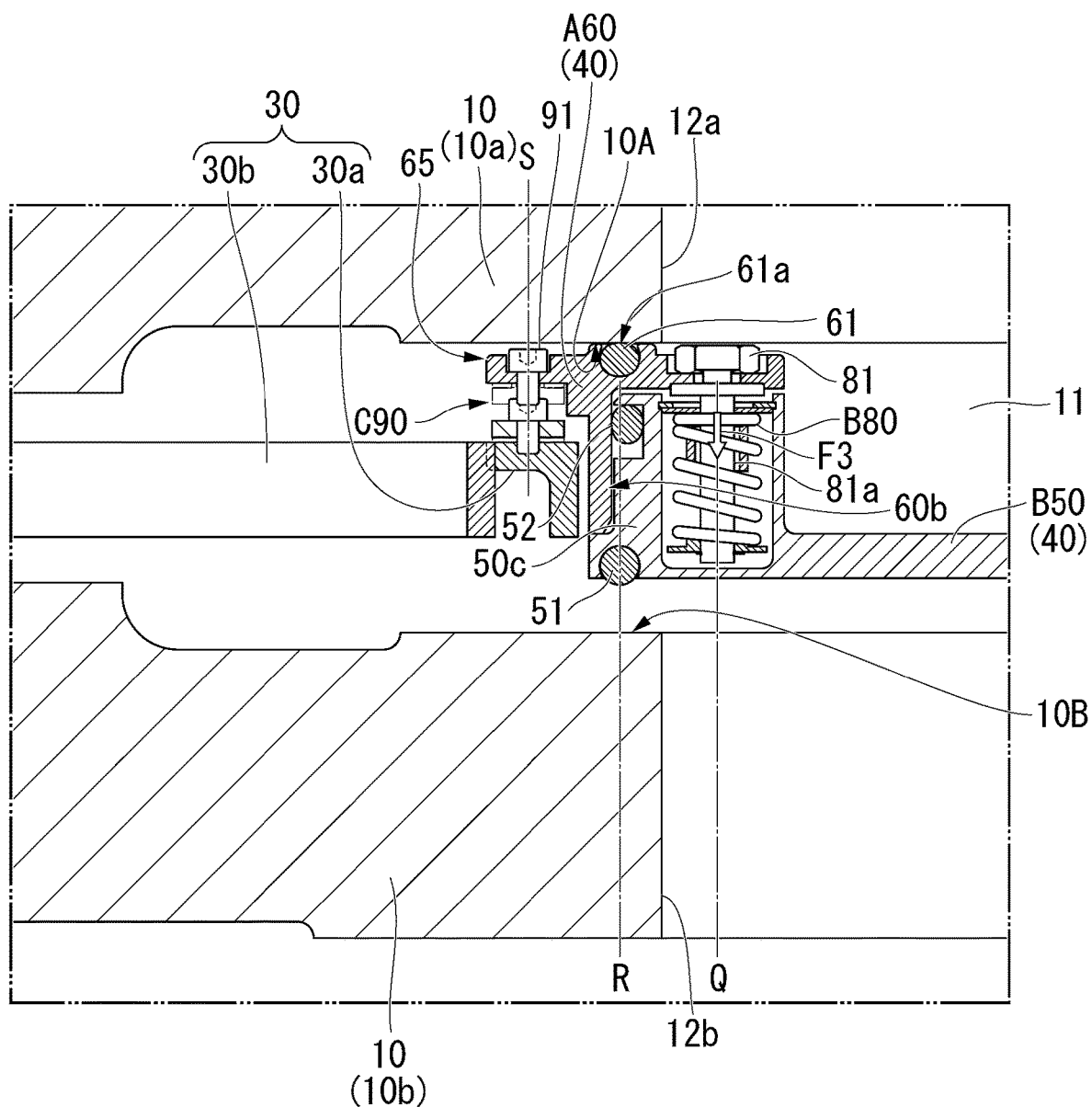
FIG. 9 is an enlarged view showing relevant part taken along the line segment B-O shown in FIG. 1 and is a view showing a case where the valve body is disposed at a valve closing position (positive pressure or non-differential pressure).

FIG. 9 is an enlarged view showing relevant part taken along the line segment B-O shown in FIG. 1 and is a view showing configurations of members located close to the force-applying unit B disposed between the movable valve A and the movable valve B.

Figure 10:
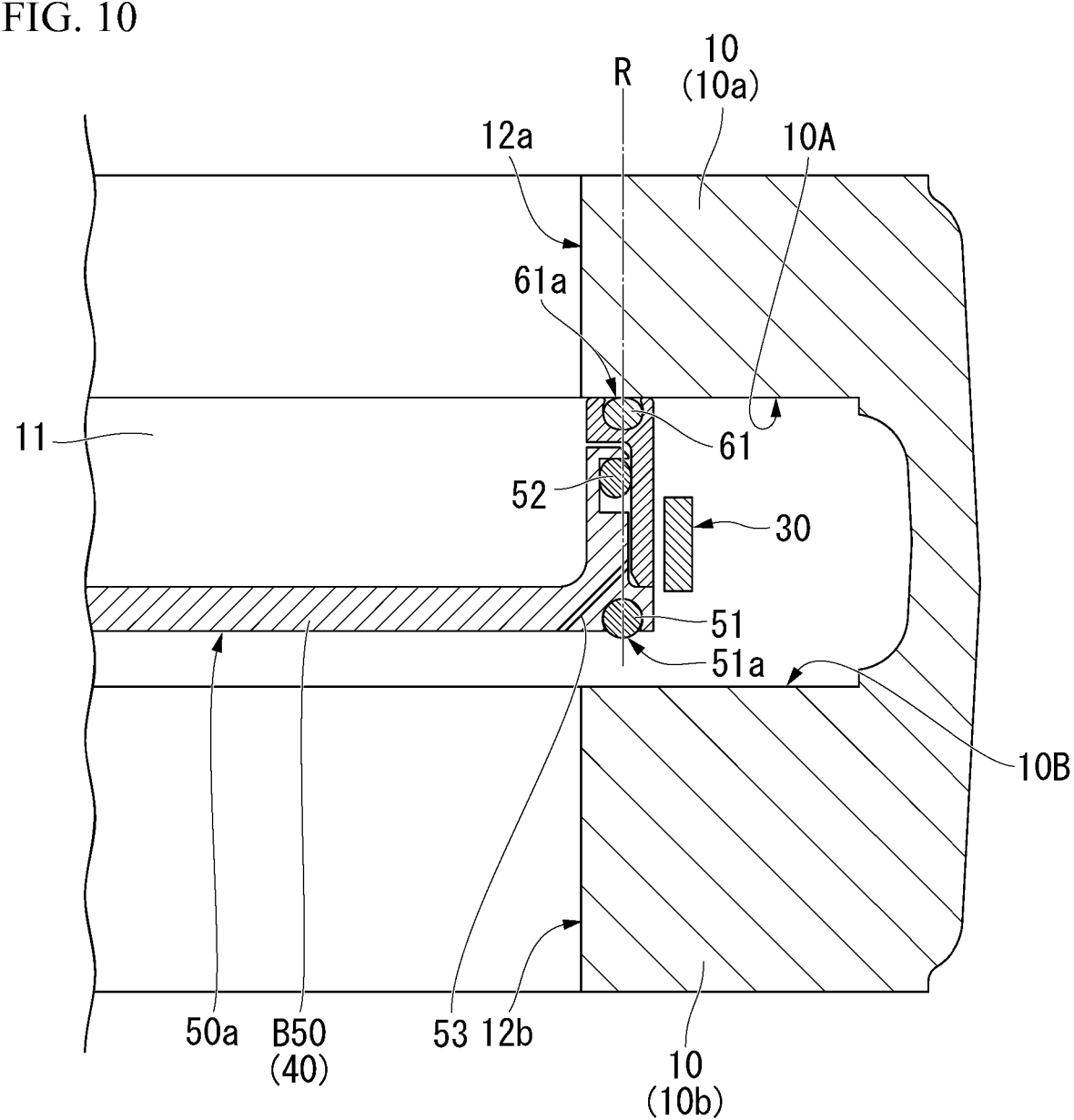
FIG. 10 is an enlarged view showing relevant part taken along the line segment C-O shown in FIG. 1 and is a view showing a case where the valve body is disposed at a valve closing position (positive pressure or non-differential pressure).

FIG. 10 is an enlarged view showing relevant part taken along the line segment C-O shown in FIG. 1 and is a view showing the movable valve A and the movable valve B at a position at which the force-applying unit A and the force-applying unit B are not present.

Figure 11:
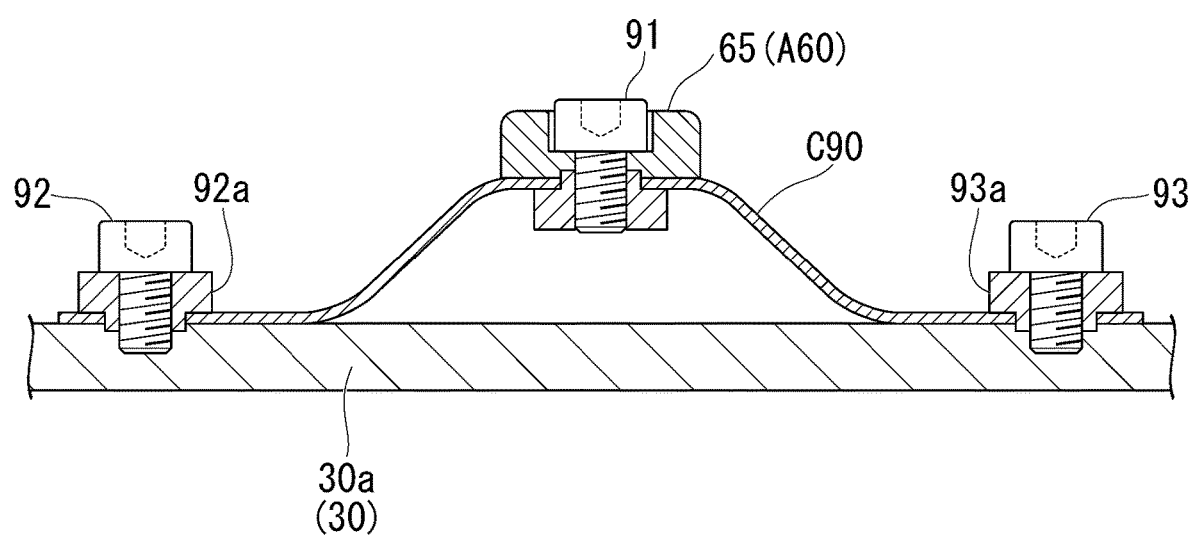
FIG. 11 is an enlarged view showing relevant part of a force-applying unit C shown in FIG. 7 and is a view showing a case where the valve body is disposed at a valve closing position (positive pressure or non-differential pressure).

FIG. 11 is an enlarged view showing relevant part of the force-applying unit C shown in FIG. 1 and is a view showing the force-applying unit C as seen in the paperface depth direction in FIG. 7.

Figure 12:
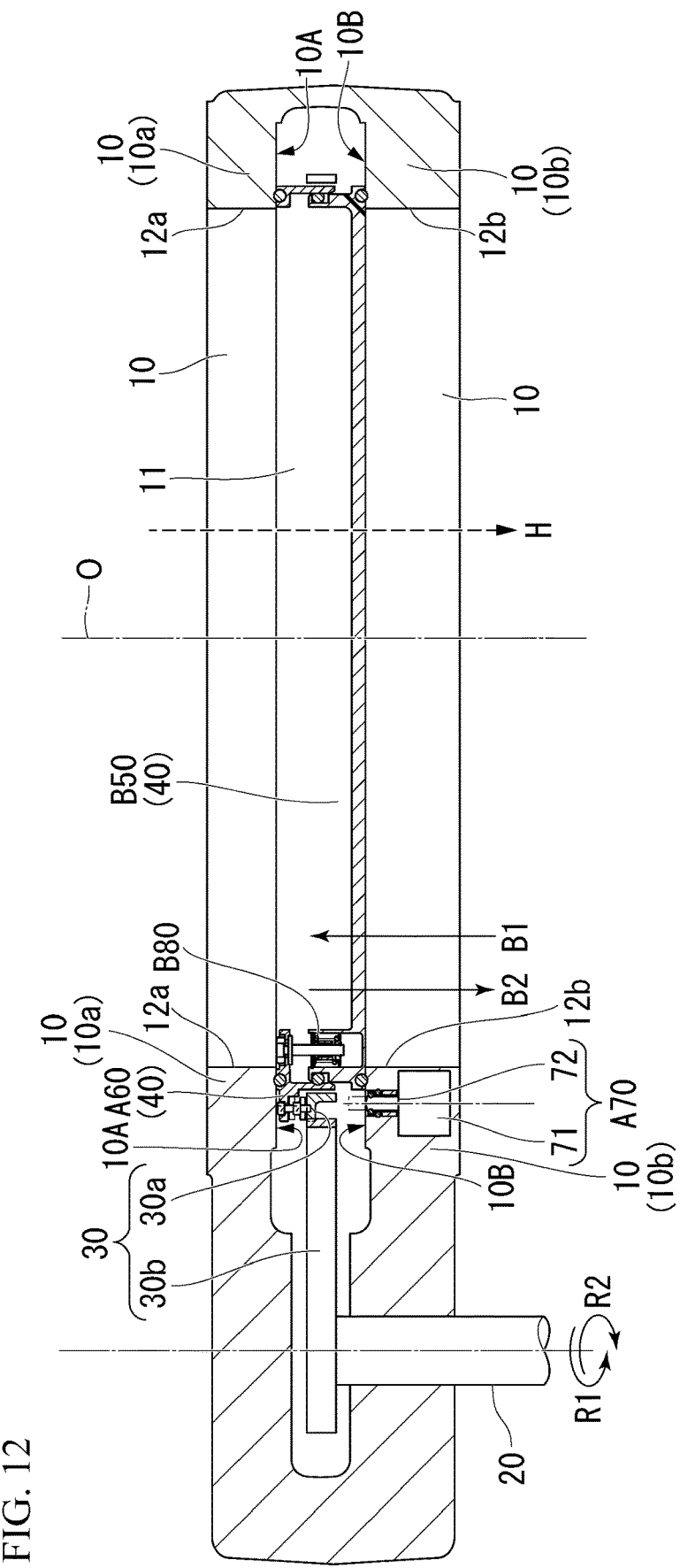
FIG. 12 is a vertical cross-sectional view showing the configuration of the gate valve according to the embodiment of the invention and is a view showing a case where the valve body is disposed at a back pressure position.

FIG. 12 is a vertical cross-sectional view showing the configuration of the gate valve according to the embodiment and is a view showing a case where the valve body is disposed at a back pressure position. FIG. 12 corresponds the line segment B-O-C shown in FIG. 1. Similar to FIG. 12, FIGS. 13 to 15 are views showing a case where the valve body is disposed at a back pressure position.

Figure 13:
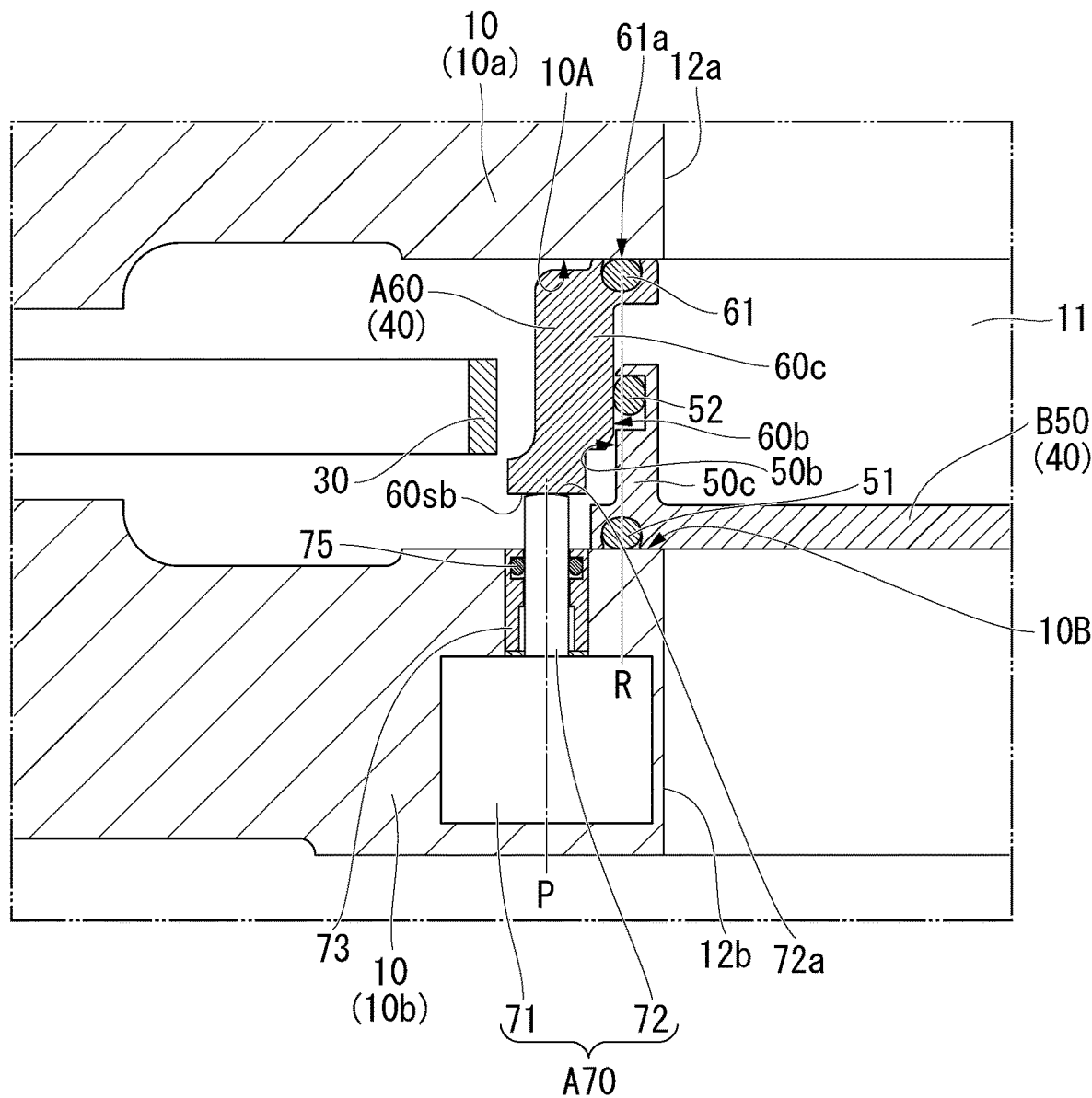
FIG. 13 is an enlarged view showing relevant part taken along the line segment A-O shown in FIG. 1 and is a view showing a case where the valve body is disposed at a back pressure position.

FIG. 13 is an enlarged view showing the portion taken along the line segment A-O shown in FIG. 1 and is a view showing configurations of members located close to the force-applying unit A that is built in the valve box.

Figure 14:
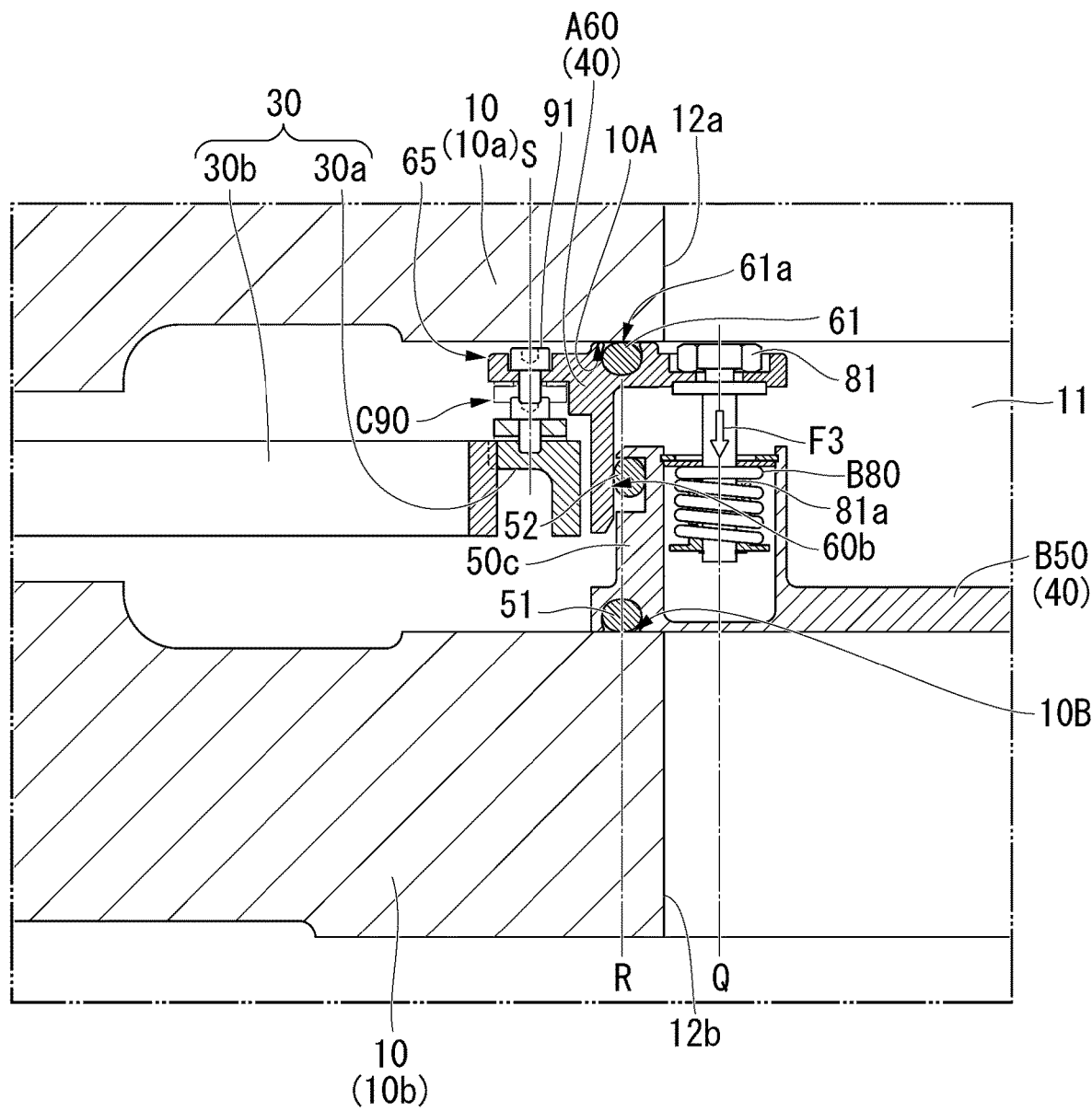
FIG. 14 is an enlarged view showing relevant part taken along the line segment B-O shown in FIG. 1 and is a view showing a case where the valve body is disposed at a back pressure position.

FIG. 14 is an enlarged view showing relevant part taken along the line segment B-O shown in FIG. 1 and is a view showing configurations of members located close to the force-applying unit B disposed between the movable valve A and the movable valve B.

Figure 15:
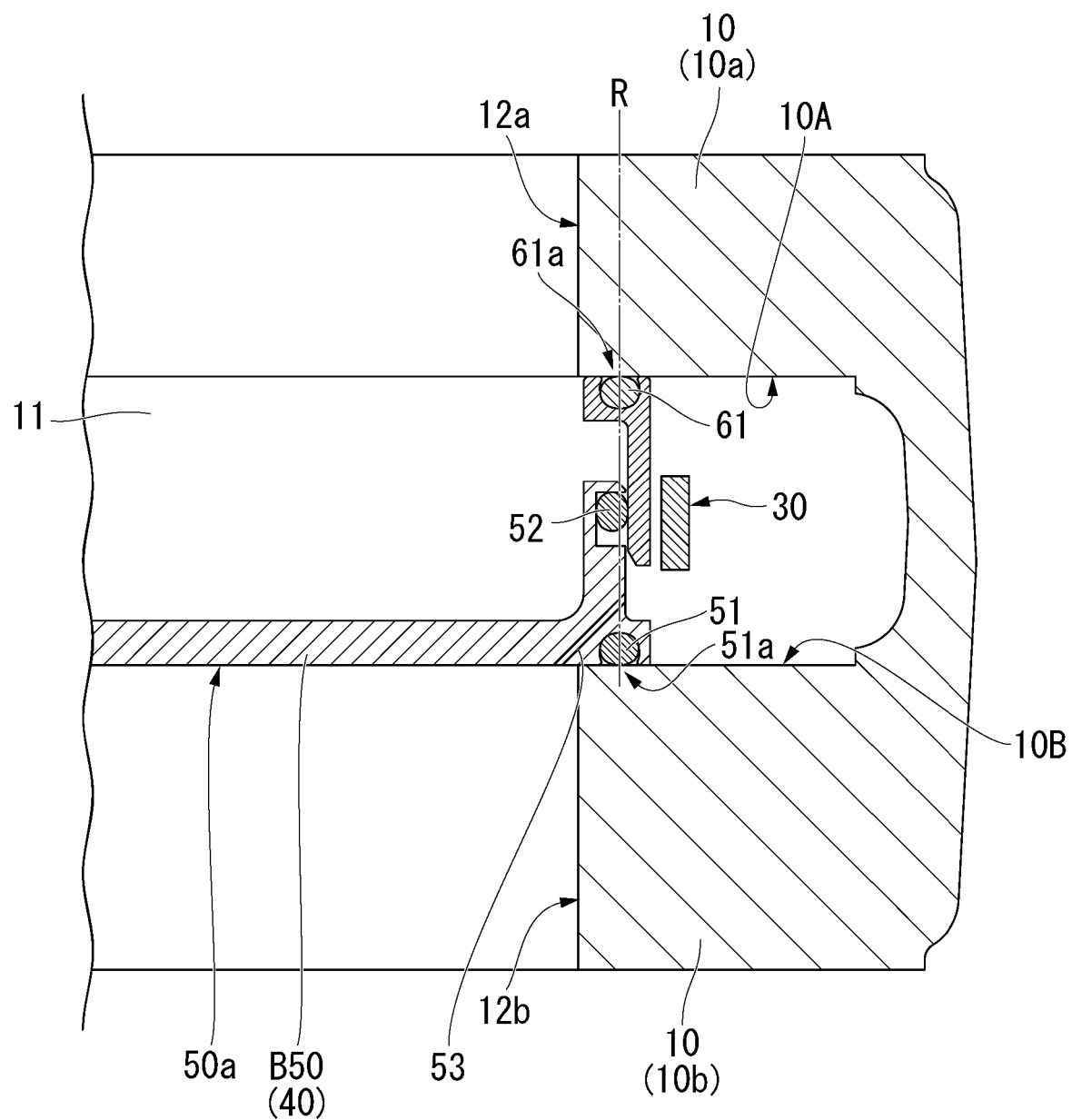
FIG. 15 is an enlarged view showing relevant part taken along the line segment C-O shown in FIG. 1 and is a view showing a case where the valve body is disposed at a back pressure position.

FIG. 15 is an enlarged view showing relevant part taken along the line segment C-O shown in FIG. 1 and is a view showing the movable valve A and the movable valve B at a position at which the force-applying unit A and the force-applying unit B are not present.

(Pendulum Gate Valve)

As shown in FIGS. 1 to 15, a gate valve 100 according to the embodiment of the invention is a pendulum gate valve.

The gate valve 100 includes: a hollow portion 11; a valve box 10 having a first opening portion 12a and a second opening portion 12b which face each other so as to sandwich the hollow portion 11 therebetween and form a flow passage communicating the hollow portion 11; and a neutral valve body 5 that is disposed inside the hollow portion 11 of the valve box 10 and can seal the first opening portion 12a.

A flow passage H is set so as to be directed from the first opening portion 12a to the second opening portion 12b. Note that, in the following explanation, the direction along the flow passage H will be referred to as a flow passage direction H.

The gate valve 100 functions as a position switcher that drives the neutral valve body 5 between: a valve sealing position at which the neutral valve body 5 is in a state of sealing the first opening portion 12a (FIG. 7); and a valve opening position at which the neutral valve body 5 is in an open state of being retracted from the first opening portion 12a (FIG. 2). In addition, the gate valve 100 includes a rotation shaft 20 having an axis line extending in the flow passage direction H.

The neutral valve body 5 is configured to include: a neutral valve 30 that is connected to the position switcher (neutral valve body 5); and a movable valve 40 that is connected to the neutral valve 30 so that the position thereof with respect to the neutral valve in the flow passage direction H is changeable.

The movable valve 40 includes a movable valve A60 (movable valve frame) and a movable valve B50 (movable valve plate). A first seal portion 61 that is circumferentially provided on the movable valve A and is to be in close contact with the inner surface of the valve box 10 located around the first opening portion 12a is provided on the movable valve A60 (movable valve frame). The movable valve B50 (movable valve plate) is slidable relative to the movable valve A60 (movable valve frame) in the flow passage direction H.

A plurality of force-applying units A70 (a piston corresponding to a previous main spring) are built in the valve box 10. The force-applying unit A70 disposed inside the valve box 10 constitutes a lifting and lowering mechanism that presses the movable valve A60 in a direction toward a sealing face and can extend and contract.

Consequently, the force-applying unit A70 has a function of applying a force to the movable valve A60 in the flow passage direction H toward the first opening portion 12a and thereby causing the first seal portion 61 to be in close contact with the inner surface of the valve box 10 located around the first opening portion 12a.

In addition, the gate valve according to the embodiment of the invention includes the force-applying unit C that connects the movable valve A to the neutral valve so that the position thereof with respect to the neutral valve in the flow passage direction is changeable and applies a force to the movable valve A to be directed to a center position in the flow passage direction.

Furthermore, the gate valve according to the embodiment of the invention includes the force-applying unit A that constitutes the lifting and lowering mechanism that presses the movable valve A in the direction toward the sealing face of a valve box inner surface 10A and can extend and contract in the valve box.

According to this configuration, since the structure is obtained in which the valve body is configured to include two movable valves A and B and one force-applying unit B and the structure is obtained in which another force-applying unit A is built in the valve box, weight saving of the valve structure by the weight of the force-applying unit A is achieved. In the gate valve according to the embodiment of the invention, the force-applying unit A works in the case where the gate valve becomes the valve closed state (FIG. 7) from the valve opened state (FIG. 2); reversely, the force-applying unit C works in the case where the gate valve becomes the valve opened state (FIG. 2) from the valve closed state (FIG. 7).

The force-applying unit B (a spring corresponding to a previous air cylinder) is disposed (built in the movable valve) between the movable valve A60 (movable valve frame) and the movable valve B50 (movable valve plate). The force-applying unit B drives the movable valve A60 (movable valve frame) and the movable valve B (movable valve plate) so that the thicknesses thereof in the flow passage direction H are adjustable.

When the rotation shaft 20 rotates in a direction represented by reference numeral R1 (in the direction intersecting with the direction of the flow passage H), in accordance with this rotation, the neutral valve 30 that is fixed to the rotation shaft 20 with a connection member (not shown in the figure) interposed therebetween also rotates in a direction R1.

Additionally, since the movable valve 40 is connected to the neutral valve 30 so as to be slidable relative to the neutral valve only in the thickness direction, the movable valve 40 rotates integrally with the neutral valve 30.

As the neutral valve 30 rotates in the above-described manner, the movable valve 40 moves in pendulum motion from a safety position corresponding to the hollow portion 11 in which the flow passage H is not provided to a valve closing position of the of the flow passage H which is a position corresponding to the first opening portion 12*a*.

Furthermore, the force-applying unit A70 built in the valve box 10 is configured to include: a fixed portion 71 disposed inside the valve box 10; and a movable portion 72 that can extend and contract in a direction from the fixed portion 71 toward the movable valve A60. Because of this, the force-applying unit A70 has a function of causing the end portion of the force-applying unit A70 to come into contact with the movable valve A60 and thereby causing the movable valve A60 to move toward the first opening portion 12.

As the force-applying unit A70 has a function of causing the movable valve A60 to move toward the first opening portion 12*a*, the movable valve A60 comes into contact with the inner surface of the valve box 10, the movable valve A60 is pressed against the inner surface of the valve box 10, the flow passage H is closed (valve closing operation).

Reversely, as a force-applying unit C90 has a function of separating the movable valve A60 from the first opening portion 12*a*, the movable valve A60 is separated from the inner surface of the valve box 10, thereafter the movable valve A60 is retracted, and the flow passage H is opened (release operation).

The valve closing operation and the release operation are possible due to mechanical contact operation using the force-applying unit A70 that causes the movable valve A60 to come into contact with the inner surface of the valve box 10 and due to mechanical separation operation using the force-applying unit C90 that separates the movable valve A60 from the inner surface of the valve box 10.

After the release operation, when the rotation shaft 20 rotates in a direction represented by reference numeral R2 (retraction operation), in accordance with this rotation, the neutral valve 30 and the movable valve 40 (that is, the movable valve A60 and the movable valve B50) also rotate in the direction R2.

Moreover, the force-applying unit B that drives the movable valve A60 and the movable valve B50 so that the thicknesses thereof in the flow passage direction H are adjustable is disposed between the movable valve A and the movable valve B. That is, the force-applying unit B is built in the movable valve. As the force-applying unit B exists, the movable valve A and the movable valve B cooperatively work in a series of operations (valve closing operation, release operation, and retraction operation).

By the release operation and the retraction operation, valve opening operation is carried out in which the movable valve 40 retracts from the aforementioned valve opening-closing position to the aforementioned safety position and is in a valve open state.

As stated above, in the gate valve according to the embodiment of the invention, the structure is obtained in which the valve body is configured to include: two of the movable valve A60 and the movable valve B50; and two of the force-applying unit B80 and the force-applying unit C90 and in which another force-applying unit A is built in the valve box. That is, in the embodiment of the invention, weight saving of the valve body by the weight of another force-applying unit A built in the valve box is achieved.

As a result, in the embodiment of the invention, it is possible to provide a gate valve that can carry out isolation operation with a high degree of reliability, achieves a weight saving of a movable valve, and can realize 100% of a back pressure cancellation rate.

(Valve Box 10)

The valve box 10 is configured to include a frame having a hollow portion 11. The first opening portion 12*a* is provided on the upper face of the frame shown in figure, and the second opening portion 12*b* is provided on the lower face of the frame shown in figure.

The gate valve 100 is to be inserted between a space (first space) to which the first opening portion 12*a* is exposed and a space (second space) to which the second opening portion 12*b* is exposed. The gate valve 100 separates (closes) the flow passage H communicating the first opening portion 12*a* to the second opening portion 12*b*, that is, the flow passage H communicating the first space to the second space, and releases this separated state (communicates the first space to the second space).

In the hollow portion 11 of the valve box 10, the rotation shaft 20, the neutral valve 30, two of the movable valve A60 (slide valve plate) and the movable valve B50 (counter plate) which form the movable valve 40, and two of the force-applying unit B80 (holding spring) and the force-applying unit C90 (auxiliary spring) are provided. The force-applying unit A (lifting and lowering mechanism) is provided inside the frame forming the valve box 10.

(Rotation Shaft 20)

The rotation shaft 20 extends in a state of being substantially parallel to the flow passage H, penetrates through the valve box 10, and is rotatably provided. The rotation shaft 20 is rotatable by a drive unit which is not shown in the figure.

A connection member (not shown in the figure) is firmly attached to the rotation shaft 20. The connection member is, for example, a member formed in a substantially flat plate, and is firmly attached to one end of the rotation shaft 20 by a screw.

(Neutral Valve 30)

The neutral valve 30 extends in a direction orthogonal to the axis line of the rotation shaft 20 and is disposed so as to be included in a plane parallel to the direction. The neutral valve 30 is directly fixed to the rotation shaft 20 via a connection member (not shown in the figure) or without a connection member (not shown in the figure).

As shown in FIG. 1, the neutral valve 30 includes: a circular portion 30*a* that overlaps the movable valve 40; and a rotation portion 30*b* that rotates the circular portion 30*a* in accordance with rotation of the rotation shaft 20. The rotation portion 30*b* is located between the rotation shaft 20 and the circular portion 30*a* and is formed in an arm shape such that two arms extend in a direction from the rotation shaft 20 to the circular portion 30*a*. Consequently, the circular portion 30*a* may be referred to as an arm portion.

The rotation shaft 20 and the neutral valve 30 which are mentioned above rotate with respect to the valve box 10 but is provided so that the positions thereof do not vary in the direction of the flow passage H.

The rotation shaft 20 can be selectively connected to any of the upper side and the lower side in the flow passage direction H with respect to the neutral valve 30. Alternatively, the entire neutral valve body 5, that is, both surfaces of the neutral valve body 5 can be attached to the rotation shaft 20.

In the embodiment, the case will be described where operation of opening and closing the gate valve is carried out in accordance with the placement of the gate valve in which the neutral valve body 5 moves so that the movable valve 40 blocks the first opening portion 12a when the gate valve is closed.

(Movable Valve 40, Movable Valve B50 (Movable Valve Plate: Counter Plate), and Movable Valve A60 (Movable Valve Frame: Slide Valve Plate))

The movable valve 40 is formed in a substantially disk shape and includes: the movable valve B50 that is formed in a substantially concentric form with respect to the circular portion 30a; and the movable valve A60 that is disposed so as to surround the circumference of the movable valve B50 and is formed in a substantially circular ring shape. The movable valve A60 is slidably connected to the neutral valve 30 in the direction of the flow passage H. Moreover, the movable valve B50 is slidably fitted into the movable valve A60.

The movable valve B50 and the movable valve A60 can move and slide by the force-applying unit B80 (holding spring) in the direction (reciprocal direction) represented by reference numerals B1 and B2 (FIG. 2). Here, the direction represented by reference numerals B1 and B2 is a direction perpendicular to the surfaces of the movable valve B50 and the movable valve A60, and is the direction of the flow passage H parallel to the axial direction of the rotation shaft 20.

Additionally, an inner-crank portion 50c is formed on the entire region near the outer-periphery of the movable valve B50. In addition, an outer-crank portion 60c is formed on the entire region near the inner-periphery of the movable valve A60.

In the embodiment, the outer-crank portion 60c has a sliding surface 60b parallel to the direction of the flow passage H. The inner-crank portion 50c has a sliding surface 50b parallel to the direction of the flow passage H. The outer-crank portion 60c and the inner-crank portion 50c are fitted to each other so that the sliding surfaces 50b and 60b are slidable to each other. In order to achieve this sliding, a third seal portion 52 (slide sealing packing) formed of an O-ring or the like is disposed between the outer-crank portion 60c and the inner-crank portion 50c.

The first seal portion 61 (valve plate sealing packing) that is formed in a circular ring shape so as to correspond to the shape of the first opening portion 12a and is formed of, for example, an O-ring or the like is provided on the surface of the movable valve A60 which is opposed to (in contact with) the inner surface of the valve box 10.

In the case where the movable valve 40 covers the first opening portion 12a when the gate valve is closed, the first seal portion 61 is in contact with the valve box inner surface 10A of the valve box 10 which forms the circumferential edge of the first opening portion 12a, and is pressed by the movable valve A60 and the valve box inner surface 10A of the valve box 10. Because of this, the first space is reliably isolated from the second space (separated state is ensured).

A second seal portion 51 (counter cushion) that is formed in a circular ring shape so as to correspond to the shape of the second opening portion 12b and is formed of, for example, O-ring or the like is provided on the surface of the movable valve B50 which is opposed to (in contact with) the valve box inner surface 10A of the valve box 10.

(Force-Applying Unit B80 (Holding Spring))

The force-applying unit B80 (holding spring) is located between the movable valve A and the movable valve B and is locally disposed on the region on which the movable valve A60 overlaps the movable valve B50. That is, the force-applying unit B80 is built in the movable valve 40 (between movable valve A60 and the movable valve B50). The points at which the force-applying units B80 are provided are preferably three points or more and are separated from each other. As alignment in which the force-applying units B80 are separated from each other, it is not limited to alignment having even intervals, and a configuration may be adopted in which a plurality of force-applying units B80 are disposed at uneven intervals. FIG. 1 shows a configuration example in which three force-applying units B80 are disposed at the same angular positions (120 degrees) as each other as seen from the center O of the valve body.

The force-applying unit B80 is configured to guide (limit) movement of the movable valve B by a long axis portion of a bolt-shaped guide pin 81 fixed to the movable valve A60 (movable valve frame: slide valve plate). A holding spring forming the force-applying unit B80 is made of an elastic member (for example, spring, rubber, or the like).

The force-applying unit B80 (holding spring) drives the movable valve A60 and the movable valve B50 so that the thicknesses thereof in the flow passage direction H are adjustable. Accordingly, the movable valve B50 works cooperatively with movement of the movable valve A60 in a direction (direction represented by reference numeral B1 or direction represented by reference numeral B2). At this time, since the movable valve B50 drives so that the thickness thereof in the flow passage direction H is adjustable, when the gate valve is closed described above, the impact generated at the time when the first seal portion 61 of the movable valve A60 comes into contact with the valve box inner surface 10A of the valve box 10 is released. Also, when the gate valve is opened or back pressure occurs, the impact generated at the time when the second seal portion 51 of the movable valve B50 comes into contact with a valve box inner surface 10B of the valve box 10 is released. When the impact is received, a sealed space is formed by the movable valve B50, the valve box inner surface 10B, and the second seal portion 51. In order to remove gas that applies a pressure to this sealed space, a ventilator hole 53 is provided at the movable valve B50.

(Guide Pin 81)

The guide pin 81 is securely fixed to the movable valve A60, provided upright in the flow passage direction H, and formed in a rod shape having a uniform diameter. The guide pin 81 penetrates through the inside of the force-applying unit B80 and is fitted into a hole portion 50h formed at the movable valve B50.

The guide pin 81 limits the positions of the movable valve B50 and the movable valve A60 and reliably guides them so that the direction (axis represented by reference letter Q) in which the movable valve B50 and the movable valve A60 slide to each other does not displace from the direction represented by reference numerals B1 and B2 and so that the movable valve B50 and the movable valve A60 carry out parallel movement without change in the postures thereof even when the movable valve B50 and the movable valve A60 slide to each other.

(Force-Applying Unit C90 (Auxiliary Spring))

The force-applying unit C90 (auxiliary spring) is provided between the neutral valve 30 and the movable valve A60, connects the movable valve A60 to the neutral valve 30 so that a position thereof with respect to the neutral valve in the flow passage direction is changeable in the flow passage direction H of the valve box 10, and applies a force to the movable valve A to be directed to a center position in the flow passage direction. Accordingly, in the embodiment of the invention, in the case where the gate valve turns from the valve closed state (FIG. 7) to the valve opened state (FIG. 2), the force-applying unit C90 works. That is, the force-applying unit C90 has a configuration to prompt mechanical separation operation of separating the movable valve A60 from the inner surface of the valve box 10 in the valve closed state (FIG. 7).

The force-applying unit C90 includes the circular portion 30a located at the outer-periphery position of the neutral valve 30, is located at the outer-periphery position of the movable valve A60, and is provided at a portion (position regulation portion 65) that overlaps the circular portion 30a.

As seen from the center O of the valve body, the force-applying units C90 are disposed at the same angular positions as those of the force-applying units B80. FIG. 1 shows a configuration example in which three force-applying units C90 are disposed.

Similar to the force-applying unit B80, the force-applying unit C90 is an elastic member (for example, spring, rubber, plate spring, or the like).

Particularly, in the case where a plate spring (FIGS. 6 and 11) is used as the force-applying unit C90, since it is possible to provide a function β of maintaining a position of the movable valve A60 in radial direction with respect to the neutral valve 30 (arm) in addition to a function α of drawing the movable valve A60 into the neutral valve 30 (arm) and holding the movable valve (function of prompting mechanical separation operation from the valve closed state (FIG. 7)), it is more preferable.

FIG. 6 is a schematic cross-sectional view showing the force-applying unit C90 in the case where the gate valve is in the valve opened state (FIG. 2). FIG. 11 is a schematic cross-sectional view showing the force-applying unit C90 in the case where the gate valve is in the valve closed state (FIG. 7).

As shown in FIG. 6 or 11, the portions close to both end portions of the plate spring (force-applying unit C90) hold ring-shaped members 92a and 92b by fixation pins 92 and 93 and are locked along the circumferential direction of the circular portion 30a of the neutral valve 30. Furthermore, the portion close to the center portion of the plate spring is locked to the position regulation portion 65 of the movable valve A60 by a pressure applying pin 91.

The plate spring in the case where the gate valve is in the valve opened state (FIG. 2) has curve portions 90A, and therefore is in a state where the distance thereof in height direction is contracted, that is, in a state where a separation distance of the movable valve A60 with respect to the neutral valve 30 (arm) is narrow (FIG. 6).

In contrast, the plate spring in the case where the gate valve is in the valve closed state (FIG. 7) releases the curve portions 90A shown in FIG. 6, and therefore is in a state where the distance thereof in height direction is expanded, that is, in a state where separation distance of the movable valve A60 with respect to the neutral valve 30 (arm) widens (FIG. 11).

As described above, as a result of adopting the plate spring having an extremely simple structure as the force-applying unit C90, the force-applying unit C90 of the gate valve according to the embodiment of the invention can stably obtain the aforementioned two functions (function α and function β).

(Force-Applying Unit A70 (Lifting and Lowering Mechanism))

The force-applying unit A70 (lifting and lowering mechanism) is built in the valve box and forms a body different from the valve body including two of the movable valve A and the movable valve B and two of the force-applying unit B and the force-applying unit C.

The force-applying unit A70 has a function of causing the movable portion 72 which will be described later to apply a force to the movable valve A60 to be directed to the first opening portion 12a in the flow passage direction H and thereby causing the first seal portion 61 to be in close contact with the valve box inner surface 10A located at the periphery of the first opening portion 12a. A plurality of force-applying units A70 are built in the valve box 10. Note that, the force-applying unit A70 does not have a function of causing the first seal portion 61 to be separated from the valve box inner surface 10A located at the periphery of the first opening portion 12a but has a function such that the force-applying unit returns to the position (position in the fixed portion 71 which will be described later) from which it (movable portion 72 which will be described later) initially moves. Therefore, the force-applying unit A70 is a lifting and lowering mechanism capable of extending and contracting in a direction from the force-applying unit A70 toward the movable valve A60.

In the valve box 10, each of the force-applying units A70 having the above-described configuration is disposed at the position at which the force-applying unit acts with respect to the movable valve A60 and is provided along the movable valve A60.

In the configuration example shown in FIG. 1, the points at which the force-applying units A70 are provided are preferably three points or more and are separated from each other. As alignment in which the force-applying units A70 are separated from each other, it is not limited to alignment having even intervals, and a configuration may be adopted in which a plurality of force-applying units A70 are disposed at uneven intervals. FIG. 1 shows a configuration example in which four force-applying units A70 are disposed at the same angular positions (90 degrees) as each other as seen from the center O of the valve body.

The force-applying units A70 in the configuration example shown in FIG. 1 are configured so that the angular positions of the force-applying units A70 do not overlap the angular positions at which the force-applying unit B80 and the force-applying unit C which are described above.

The force-applying unit A70 according to the embodiment is configured to include: the fixed portion 71 provided inside the valve box 10; and the movable portion 72 capable of extending and contracting in a direction from the fixed portion 71 toward the movable valve A60.

With this configuration, the force-applying unit A70 has two functions, that is, a function of causing the end portion 72a of the movable portion 72 to come into contact with the lower face 60sb of the movable valve A60 and thereby causing the movable valve A60 to move toward the first opening portion 12 and a function such that the force-applying unit returns to the position (position in the fixed portion 71) from which it (movable portion 72) initially moves, and therefore serves as a lifting and lowering mechanism of the valve body.

FIGS. 2 to 5 shows in a state where the movable valve 40 (movable valve A60 and the movable valve B50) is not in contact with any the valve box inner surfaces 10A and 10B of the valve box 10. This state is referred to as a state where a valve body is FREE. FIG. 6 is an enlarged view showing relevant part of the force-applying unit C in a state of being FREE (FIG. 2) and is a view showing the force-applying unit C as seen in the paperface depth direction in FIG. 2.

In a state where the valve body is the FREE, due to the function of the aforementioned force-applying unit A70, that is, due to the function of causing the movable valve A60 to move toward the first opening portion 12a, the movable valve A60 moves until being in contact with the valve box inner surface 10A of the valve box 10, the movable valve A60 presses against the valve box inner surface 10A, and therefore the flow passage H is closed (valve closing operation).

FIGS. 7 to 10 shows a state where the flow passage H is closed by the above-mentioned valve closing operation. This state is referred to as a state of positive pressure/non-differential pressure. FIG. 11 is an enlarged view showing relevant part of the force-applying unit C in a state of positive pressure/non-differential pressure (FIG. 7) and is a view showing the force-applying unit C as seen in the paperface depth direction in FIG. 7.

In a state where the valve body is in the positive pressure/non-differential pressure, due to the function of the aforementioned force-applying unit C90, that is, due to the function of causing the movable valve A60 to be connected to the neutral valve 30 so that the position thereof with respect to the neutral valve in the flow passage direction is changeable and applying a force to the movable valve A to be directed to a center position in the flow passage direction, the movable valve A60 is separated from the inner surface of the valve box 10 and the movable valve A60 is retracted, and the flow passage H is thereby opened (release operation).

As described above, in the gate valve according to the embodiment, since the first seal portion 61 (valve plate sealing packing) formed of O-ring or the like and the third seal portion 52 (slide sealing packing) formed of O-ring or the like are disposed on the substantially same cylindrical surface (for example, they are disposed so as to overlap the line R shown in FIGS. 3 to 5), approximately 100% of a back pressure cancellation rate is obtained.

Furthermore, the force-applying unit A70 of the gate valve according to the embodiment is built in the valve box 10 and forms a body different from the neutral valve body 5 including two of the movable valve A60 and the movable valve B50, two of the force-applying unit B80 and the force-applying unit C90. As a result, in the gate valve 100 according to the embodiment, weight saving of the valve structure by the weight of the force-applying unit A70 is achieved.

Consequently, according to the gate valve of the embodiment, since it is possible to achieve isolation operation with a high degree of reliability and the weight of the valve body is reduced, it is possible to reduce a driving power that is necessary when the valve body moves upward and downward or the valve body moves while revolving, and therefore simplification of the configuration of the valve body and weight saving thereof is achieved.

Figure 20:
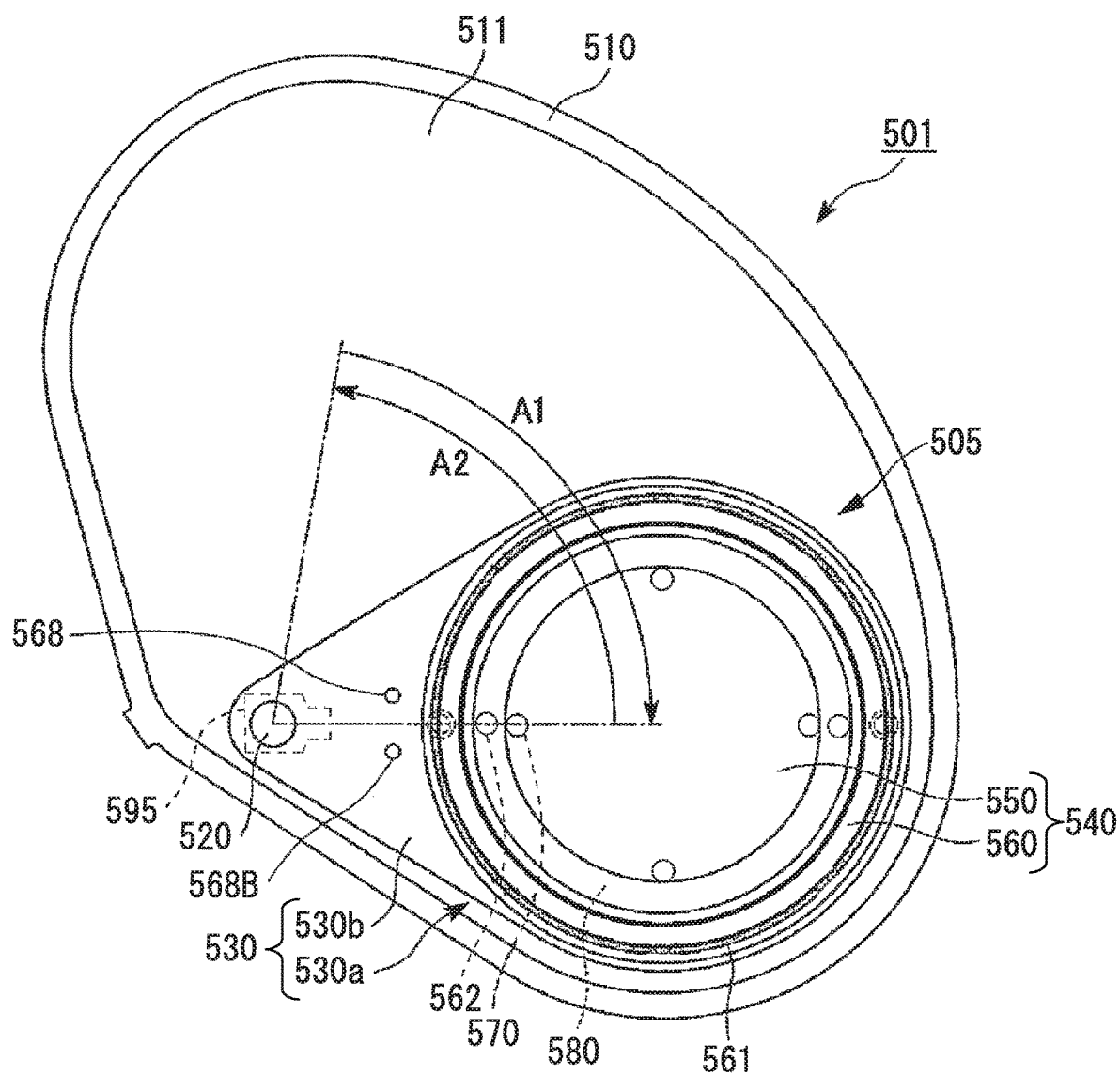
FIG. 20 is a horizontal cross-sectional view showing a configuration of a conventional gate valve.
Figure 21:
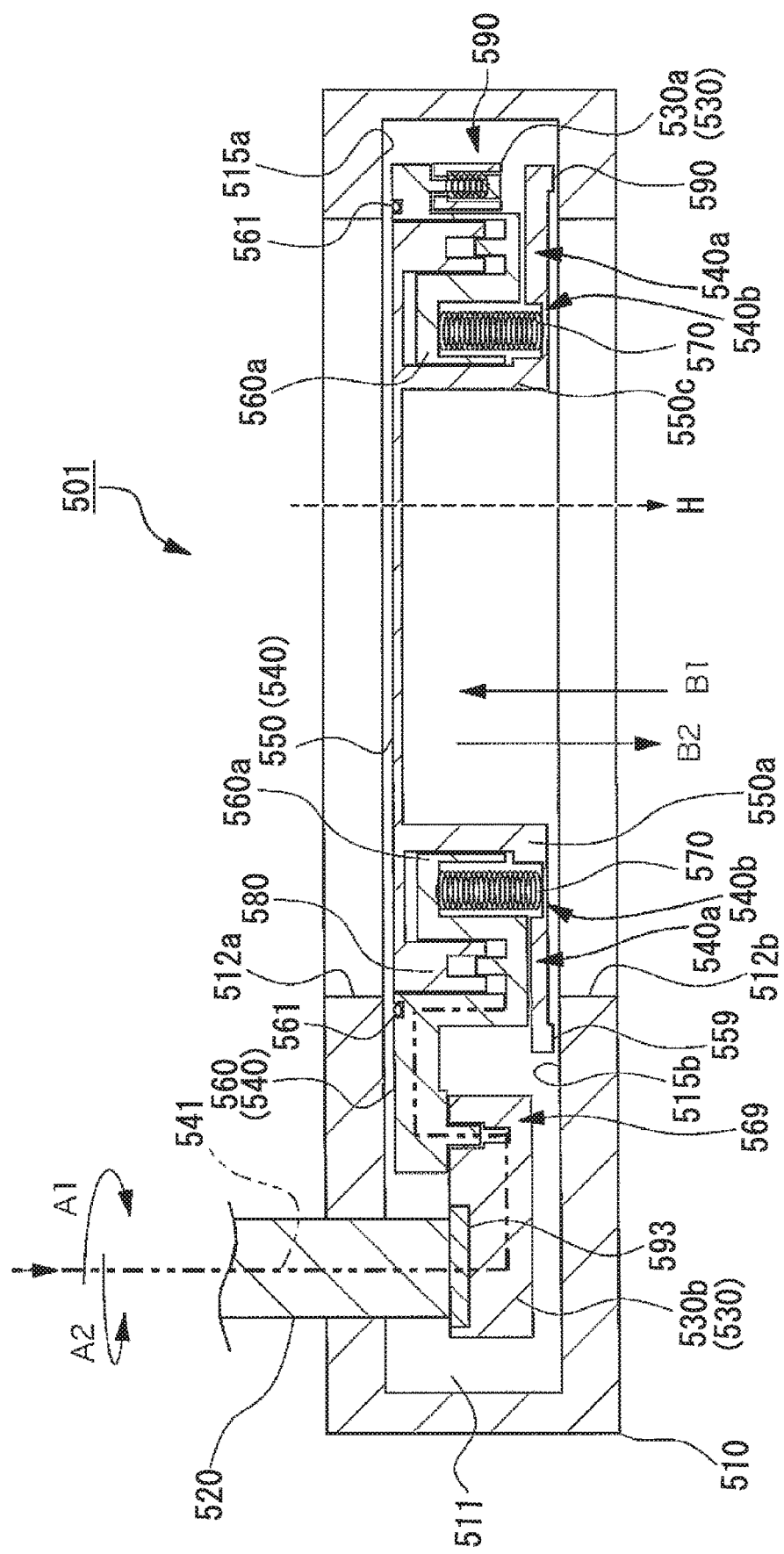
FIG. 21 is a vertical cross-sectional view showing the configuration of the conventional gate valve and is a view showing a case where a valve body is disposed at a position at which a retraction operation can be carried out.
Figure 22:
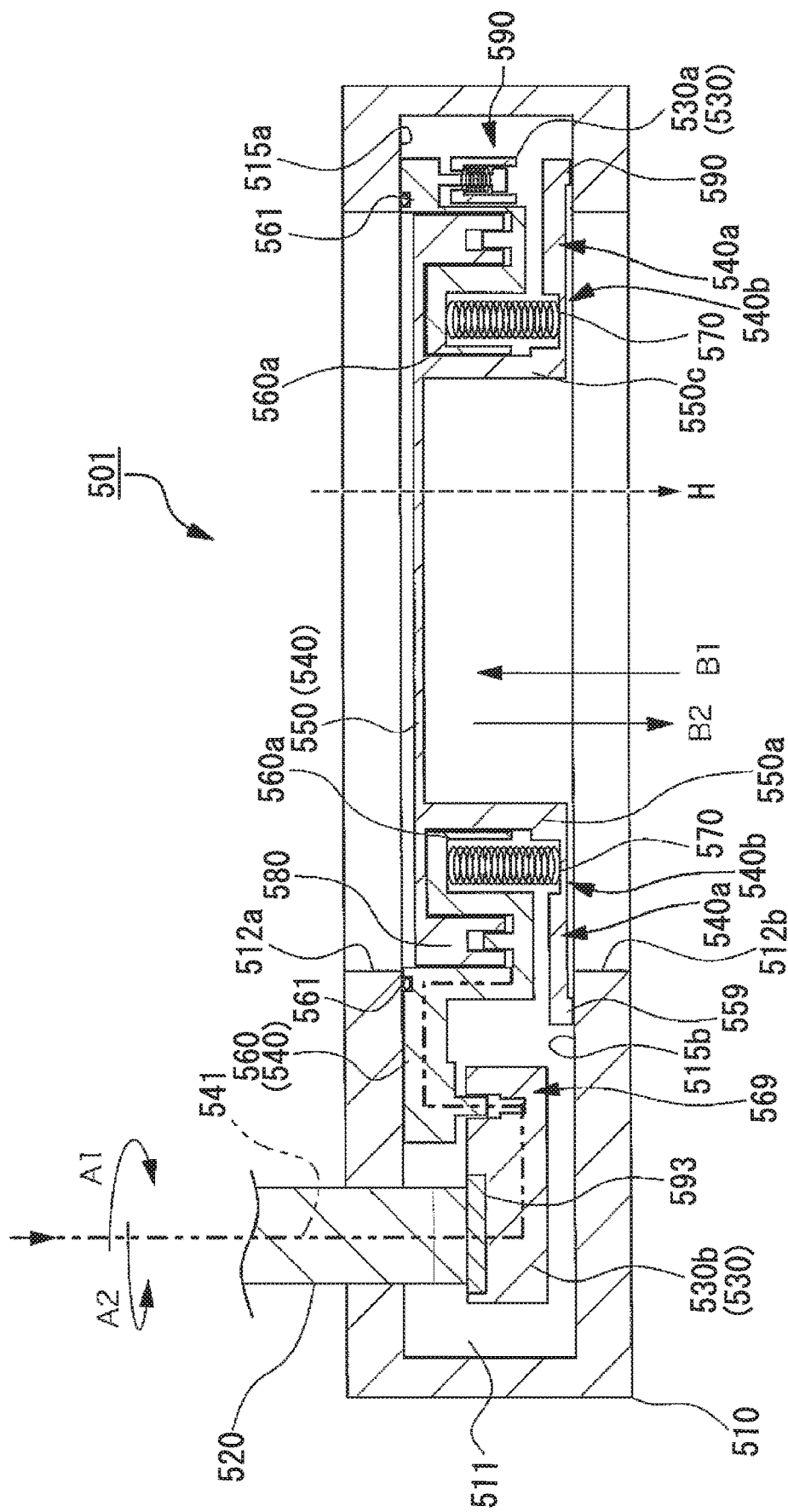
FIG. 22 is a vertical cross-sectional view showing the configuration of the conventional gate valve and is a view showing a case where the valve body is disposed at a valve closing position.

FIGS. 20 to 22 are views showing a conventional gate valve 501, FIG. 20 shows a horizontal cross-sectional view, and FIGS. 21 and 22 are vertical cross-sectional views. FIG. 21 shows a case where a valve body is disposed at a position at which a retraction operation can be carried out, and FIG. 22 shows a case where a valve body is disposed at a valve closing position (Patent Document 4).

As shown in FIGS. 20 to 22, in a conventional gate valve 501, a valve structure thereof includes a ring-shaped air cylinder 580 corresponding to the force-applying unit A70 of the gate valve 100 according to the embodiment, a supply line 541 that introduces compressed air into the air cylinder 580 is also necessary, and the valve structure is extremely complicated. In contrast, since the force-applying unit A70 according to the embodiment of the invention is disposed inside the valve box 10, is not included in a valve structure, and simplification of the valve structure thereof is also achieved. The supply line 541 that is essential for the conventional gate valve 501 is not necessary for the gate valve 100 according to the embodiment.

Accordingly, as the gate valve according to the embodiment of the invention employs the force-applying unit A70 that is disposed inside the valve box and is not included in the valve structure, a member or a device which is driven by power lower than a conventional case can be selected as a drive unit that causes the rotation shaft 20 to rotate, and therefore the invention contributes to achievement of an energy saving gate valve.

Consequently, the invention contributes to provision of the gate valve that can carry out isolation operation with a high degree of reliability, achieves a weight saving of a movable valve, and can realize 100% of a back pressure cancellation rate.

Note that, although FIG. 2 shows the configuration in which the force-applying unit A70 is built in the valve box 10 (10b) at the position close to the second opening portion 12b, the invention is not limited to this configuration. For example, instead of the position close to the second opening portion 12b, the force-applying unit A70 may be provided at the position close to the first opening portion 12a. As long as the force-applying unit A70 acts with respect to the movable valve A60, the position at which the force-applying unit A70 is provided can be freely determined.

In the above-mentioned embodiment, FIG. 2 shows a configuration example of the force-applying unit A70 causes compressive force to act with respect to the movable valve A60, and valve closing operation is carried out by mechanical contact operation; however, the invention is not limited to this configuration.

As the force-applying unit A70 having a function of generating compressive force, for example, not only the above-described cylinder mechanism, a compressed air mechanism, an electromagnetic mechanism, or the like is adopted.

Note that, a configuration example of the force-applying unit A70 having both the function of causing compressive force to act with respect to the movable valve A60 and the function of causing tensile force to act with respect to the movable valve A60 will be described as modified example with reference to FIGS. 17 to 19 which will be described later.

As apparent from FIG. 3 that is a cross-sectional view taken along the line segment A-O shown in FIG. 1, the force-applying unit A70 shown in FIG. 2 is disposed under the movable valve A60 (paperface back side) in FIG. 1. That is, the embodiment shows a configuration example in which the force-applying units A70 are disposed four points at a 90-degree pitch. Although the configuration example shows the case where the four force-applying units A70 are disposed at even intervals, the invention is not limited to this configuration, it is only necessary that the number of the force-applying units A70 is a plural number of three or more, and the intervals of the force-applying unit A70 may be uneven intervals.

Moreover, although the embodiment discloses a pin-shaped cylinder that serves as a member functioning as the force-applying unit A70 that is locally disposed inside the valve box 10, the invention is not limited to this member. For example, instead of the pin-shaped cylinder, a ring-shaped cylinder may be used as the force-applying unit A70.

(State where Valve Body is Located at Position (FREE) at which Retraction Operation can be Carried Out)

Hereinbelow, a state where a valve body is FREE will be described with reference to FIGS. 1 to 6.

FIG. 1 is a horizontal cross-sectional view showing the configuration of the gate valve according to the embodiment of the invention, and FIG. 2 is a vertical cross-sectional view. FIG. 3 is an enlarged view showing relevant part taken along the line segment A-O shown in FIG. 1, FIG. 4 is an enlarged view showing relevant part taken along the line segment B-O shown in FIG. 1, and FIG. 5 is an enlarged view showing relevant part taken along the line segment C-O shown in FIG. 1. Additionally, FIG. 6 is an enlarged view showing relevant part of a force-applying unit C shown in FIG. 2.

A state where the neutral valve body 5 is FREE means a state where the neutral valve body 5 is not in contact with the inner surface of the valve box 10 (the inner surface of the valve box 10 located around the first opening portion 12a, the inner surface of the valve box 10 located around the second opening portion 12b).

The force-applying unit A70 (lifting and lowering mechanism) is configured to include: the fixed portion 71 disposed inside the valve box 10; and the movable portion 72 capable of extending and contracting in a direction from the fixed portion 71 toward the movable valve A60, and is in a state of being disposed inside the valve box 10 together with the fixed portion 71 and the movable portion 72. That is, the force-applying unit A70 (lifting and lowering mechanism) forming a body different from the neutral valve body 5 is in a state of not being in contact with the neutral valve body 5.

In other words, the force-applying unit A70 (lifting and lowering mechanism) is built in the valve box 10 and forms a body different from the neutral valve body 5 including two of the movable valve A60 and the movable valve B50, and the force-applying unit C90.

The force-applying unit A70 is configured to include: the fixed portion 71 disposed inside the valve box 10; and the movable portion 72 capable of extending and contracting in a direction from the fixed portion 71 toward the movable valve A60.

With this configuration, the force-applying unit A70 has two functions, that is, a function of causing the end portion 72a of the movable portion 72 to come into contact with the lower face 60sb of the movable valve A60 and thereby causing the movable valve A60 to move toward the first opening portion 12 and a function of reversely causing the movable valve A60 to be separated from the first opening portion 12, and therefore serves as a lifting and lowering mechanism of the valve body.

As shown in FIG. 3, as the end portion 72a of the movable portion 72 forming the force-applying unit A70 comes into contact with the lower face 60sb of the movable valve A60 (arrow F1), the movable valve A60 forming the neutral valve body 5 moves toward the inner surface of the valve box 10 (the valve box inner surface 10A of the valve box 10 which is located around the first opening portion 12a) (arrow F2). As a result of this movement, a state where the first seal portion 61 (valve plate sealing packing) is in contact with the valve box inner surface 10A of the valve box 10 is a state of a valve closed position (valve closed state).

Since the movable valve B50 and the movable valve A60 can move by the holding spring (force-applying unit B80) in the direction represented by reference numerals B1 and B2 (FIG. 2) (reciprocal direction) while being slidable to each other with the third seal portion 52 interposed therebetween, when this movement, the movable valve B50 also moves in the same direction as that of the movable valve A60.

(State where Valve Body is Located at Valve Closing Position (Positive Pressure or Non-Differential Pressure))

Hereinbelow, a state where the valve body is located at a valve closing position will be described with reference to FIGS. 7 to 10.

FIG. 7 is a vertical cross-sectional view showing the configuration of the gate valve according to the embodiment of the invention. FIG. 8 is an enlarged view showing relevant part taken along the line segment A-O shown in FIG. 1, FIG. 9 is an enlarged view showing relevant part taken along the line segment B-O shown in FIG. 1, and FIG. 10 is an enlarged view showing relevant part taken along the line segment C-O shown in FIG. 1.

A state where the neutral valve body 5 is located at a valve closing position means a state where the neutral valve body 5 is in contact with one of the inner surfaces of the valve box 10 (the valve box inner surface 10A located around the first opening portion 12a) but is not in contact with the other of the inner surfaces (the inner surface of the valve box 10 which is located around the second opening portion 12b).

The force-applying unit A70 (lifting and lowering mechanism) causes the movable portion 72 to extend from the fixed portion 71 disposed inside the valve box 10 in a direction toward the movable valve A60 and causes the end portion 72a of the movable portion 72 to come into contact with the lower face 60sb of the movable valve A60. Consequently, as a result of causing the movable valve A60 to move toward the first opening portion 12, the first seal portion 61 provided on the upper face 60sa of the movable valve A60 is in a state being in contact with the valve box inner surface 10A of the valve box 10 which is located at the periphery of the first opening portion 12a).

(State where Valve Body is Located at Back Pressure Position)

Hereinbelow, a state where the valve body is located at a back pressure position will be described with reference to FIGS. 12 to 15.

FIG. 12 is a vertical cross-sectional view showing the configuration of the gate valve according to the embodiment of the invention. FIG. 13 is an enlarged view showing relevant part taken along the line segment A-O shown in FIG. 1, FIG. 14 is an enlarged view showing relevant part taken along the line segment B-O shown in FIG. 1, and FIG. 15 is an enlarged view showing relevant part taken along the line segment C-O shown in FIG. 1.

A state where the neutral valve body 5 is located at a back pressure position means a state where the neutral valve body 5 is in contact with one of the inner surfaces of the valve box 10 (the valve box inner surface 10A located around the first opening portion 12a), while this condition is maintained, the neutral valve body is also in contact with the other of the inner surfaces (the inner surface of the valve box 10 which is located around the second opening portion 12b). The back pressure means that a pressure is applied to a valve body in a direction from a valve closed state to a valve opened state.

In the case where the neutral valve body 5 receives a back pressure, the force-applying unit B80 works which is located between the movable valve A60 and the movable valve B50 which form a valve body. That is, since the movable valve B50 and the movable valve A60 can move by the force-applying unit B80 in the direction represented by reference numerals B1 and B2 (FIG. 12) (reciprocal direction) while being slidable to each other with the third seal portion 52 interposed therebetween, when the neutral valve body 5 receives a back pressure, the movable valve B50 moves relative to the movable valve A60 in the direction represented by reference numeral B2.

As a result, the movable valve B50 is about to collide against the other of inner surfaces of the valve box 10 (the valve box inner surface 10B located around the second opening portion 12b). In order to release impact due to this collision, the movable valve B50 includes the second seal portion 51 provided at the position facing the valve box inner surface 10B located around the second opening portion 12b. As mentioned above, a mechanism in which the valve box inner surface 10B of the valve box 10 (back side body) receives the force received by the neutral valve body 5 (force received in the direction represented by reference numeral B2) is a back pressure cancellation mechanism.

As the second seal portion 51, an elastic body is preferably used. In the case where the movable valve B50 collides against the valve box inner surface 10B of the valve box 10, a countermeasure is necessary which prevents occurrence of contaminants which occur at the moment of collision or occurrence of contaminants which occur due to by generation of micro sliding contact when the valve box inner surface 10B of the valve box 10 (back side body) is deformed in millimeter order. When the second seal portion 51 is made of an elastic body, as the elastic body deforms when collision, occurrence of any contaminants can be prevented.

Modified Example of Embodiment

Figure 17:
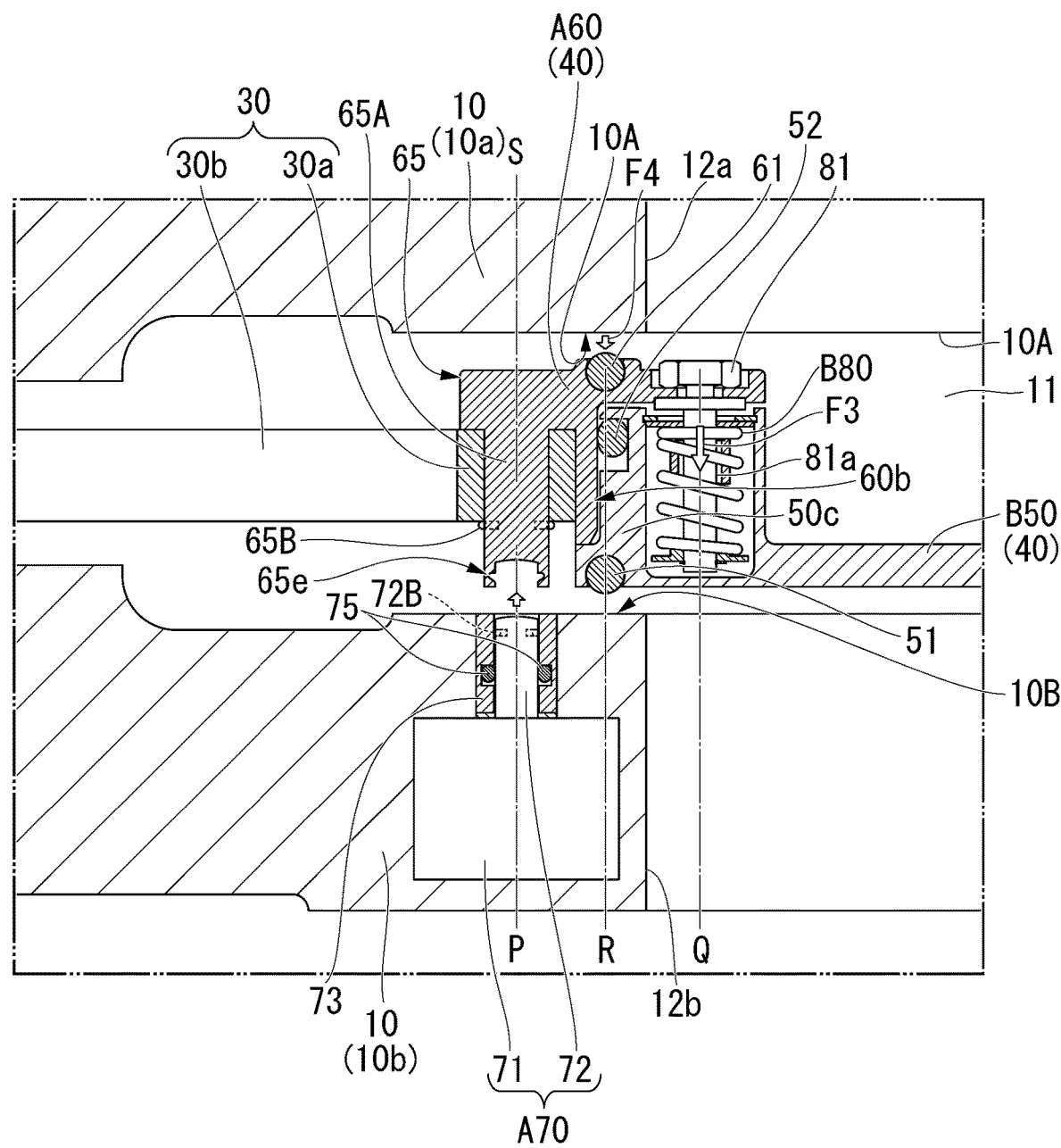
FIG. 17 is a vertical cross-sectional view showing a configuration of a gate valve according to a modified example of the embodiment of the invention and is a view showing a case where the valve body is disposed at a position (FREE) at which a retraction operation can be carried out.
Figure 18:
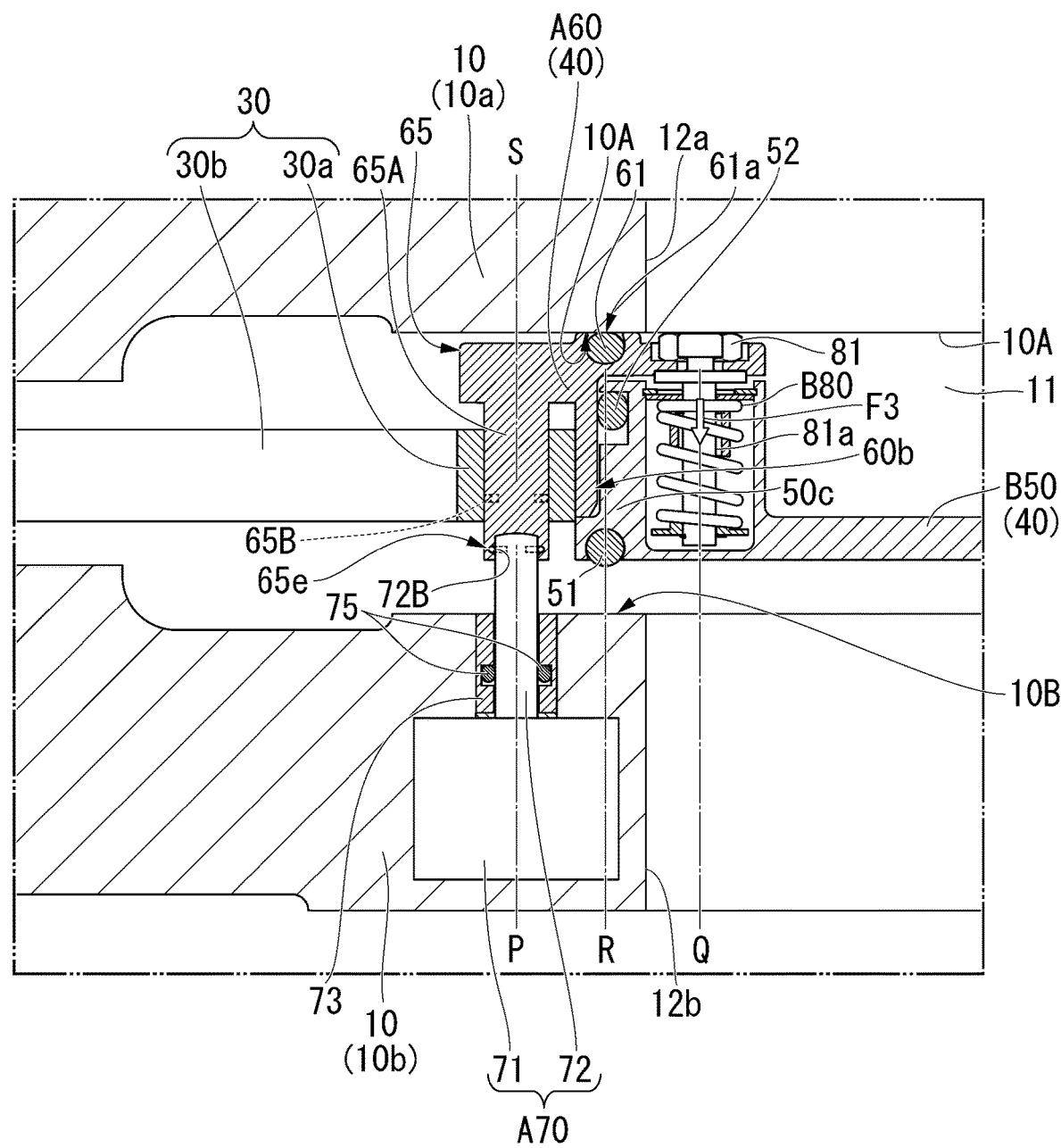
FIG. 18 is a vertical cross-sectional view showing the configuration of the gate valve according to a modified example of the embodiment of the invention and is a view showing a case where the valve body is disposed at a valve closing position (positive pressure or non-differential pressure).
Figure 19:
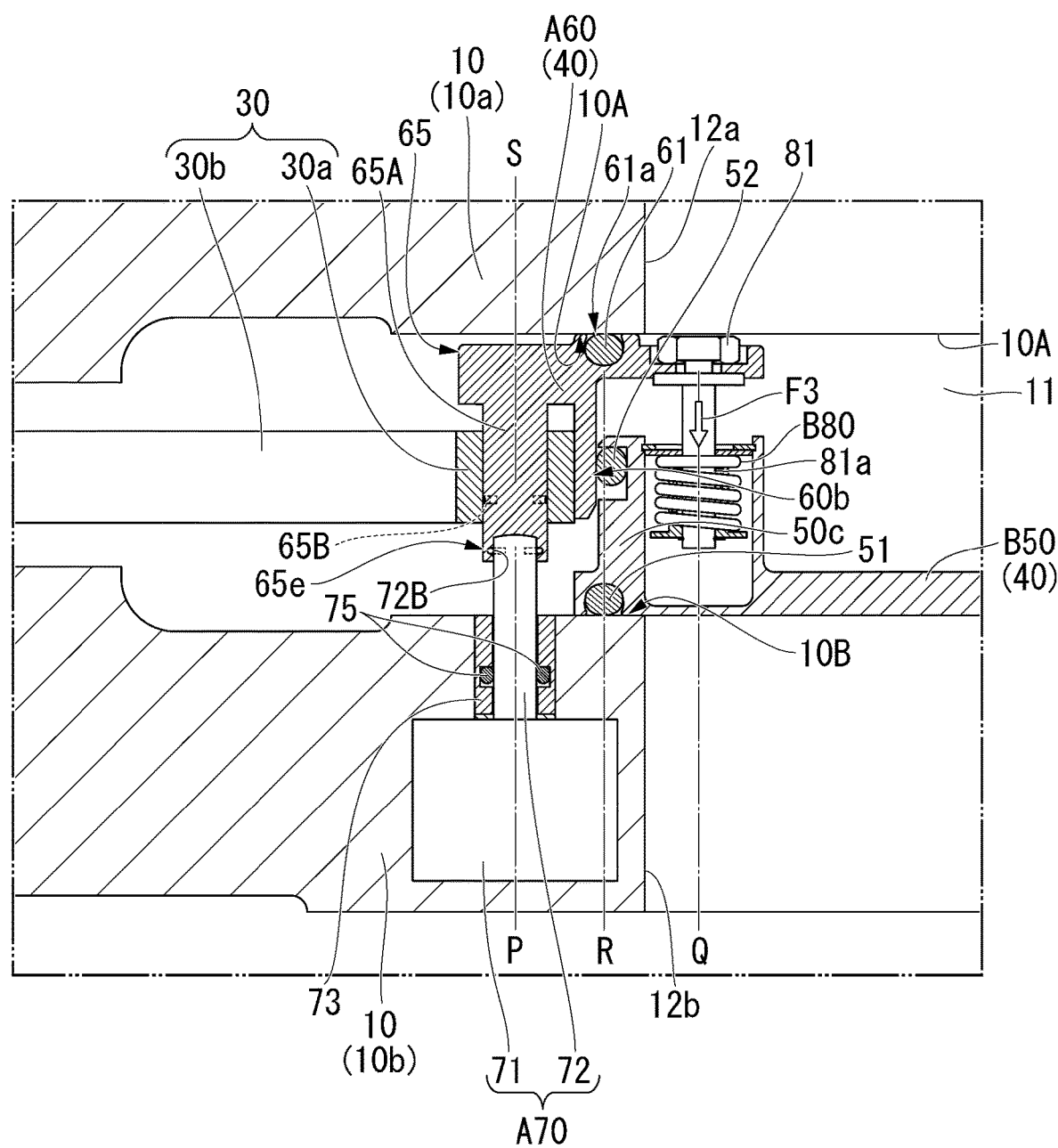
FIG. 19 is a vertical cross-sectional view showing the configuration of the gate valve according to a modified example of the embodiment of the invention and is a view showing a case where the valve body is disposed at a back pressure position.

FIGS. 17 to 19 are vertical cross-sectional views, each showing a configuration of a gate valve according to a modified example of the embodiment of the invention. FIG. 17 is an enlarged view showing relevant part taken along the line segment A-O corresponding to FIG. 3 in the case where the valve body is disposed at a position (FREE) at which a retraction operation can be carried out. FIG. 18 is an enlarged view showing relevant part taken along the line segment A-O corresponding to FIG. 8 in the case where the valve body is disposed at a valve closing position (positive pressure or non-differential pressure). FIG. 19 is an enlarged view showing relevant part taken along the line segment A-O corresponding to FIG. 13 in the case where the valve body is disposed at a back pressure position.

FIGS. 17 to 19 shows a configuration example of the force-applying unit A70 having both a function of causing compressive force to act with respect to the movable valve A60 and a function of causing tensile force to act with respect to the movable valve A60.

Figure 16:
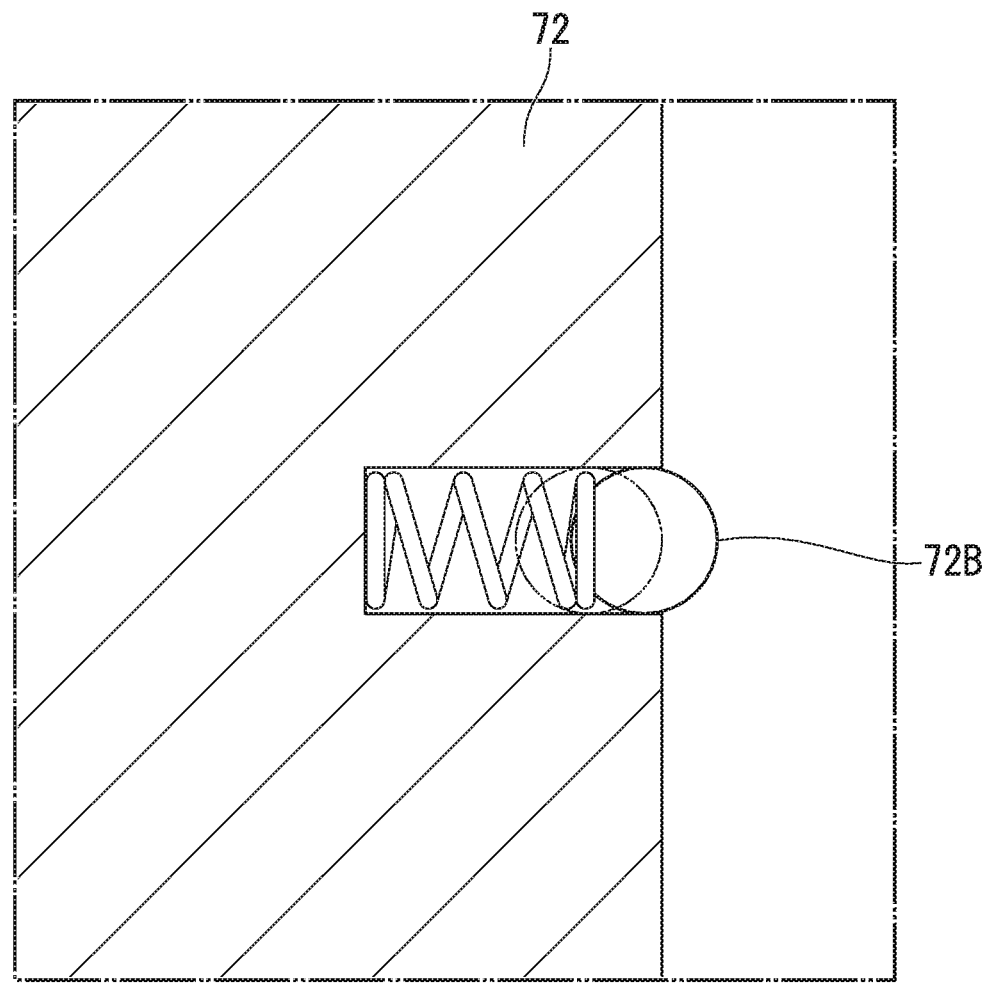
FIG. 16 is a view showing a ball plunger mechanism used in a modified example of the embodiment of the invention.

In order to provide both the two functions, the force-applying unit A70 according to the modified example is configured to include: the fixed portion 71 disposed inside the valve box 10; and the movable portion 72 that can extend and contract in a direction from the fixed portion 71 toward the movable valve A60, and furthermore a ball plunger shown in FIG. 16 is implanted on the side surface of the movable portion 72.

Here, "plunger" is a machine element part for positioning and fixing a work, the plunger is configured to include a plunger body; a spring built in the plunger body; and an end member (ball or pin) located at the end of the spring. The plunger has a mechanism in which, the end member enters the inside of the plunger body when a load is applied to the end member, and the end member returns to the original position due to action of force of the spring when the load is released. Particularly, a ball plunger is a plunger in which a ball located at the end of the spring works, it is possible to lower the ball due to an applied load not only in a vertical direction but also in a horizontal direction, and therefore it is suitable for positioning of a sliding mechanism.

A ball plunger 72B is provided on the side surface of the movable portion 72, and in the movable valve A60, a recessed portion 65e that receives the end portion of the movable portion 72 and the ball plunger 72B is disposed at the portion 65A with which the end portion of the movable portion 72 is to be in contact. According to this configuration, the force-applying unit A70 according to the modified example can have both a function of causing compressive force to act with respect to the movable valve A60 and a function of causing tensile force to act with respect to the movable valve A60.

In addition, in the gate valve according to this modified example, similar to the configuration having the ball plunger 72B provided between the movable valve A60 and the movable portion 72 serving as part of the force-applying unit A70, a configuration is adopted which has a ball plunger 65B that is also provided between the neutral valve 30 and the position regulation portion 65 serving as part of the movable valve A60. Accordingly, the force-applying unit C90 of the aforementioned embodiment is not necessary. Because of this, according to the gate valve of the modified example, as compared with the gate valve of the aforementioned embodiment, since it is possible to achieve isolation operation with a high degree of reliability and the weight of the valve body is further reduced, it is possible to further reduce a driving power that is necessary when the valve body moves upward and downward or the valve body moves while revolving, and therefore simplification of the configuration of the valve body and weight saving thereof is achieved.

In the gate valve according to the modified example, the force-applying unit B80 having the same configuration as that of the aforementioned embodiment is disposed between the movable valve B50 and the portion 67 that serves as part of the movable valve A60 and is located at the position overlapping the movable valve B50. As a result, also in the gate valve according to the modified example, a driving power that is necessary when the valve body moves upward and downward or the valve body moves while revolving is obtained by the force-applying unit B80.

That is, in the gate valve according to the modified example, as a result of adopting the configuration providing the ball plunger, it is possible to exclude the force-applying unit C90 from a valve structure, which is essential for the gate valve of the above-mentioned embodiment. For this reason, according to the modified example, it is possible to further reduce a driving power that is necessary when the valve body moves upward and downward or the valve body moves while revolving, it contributes to the gate valve that achieves simplification of the configuration of the valve body and weight saving thereof.

Note that, although a configuration providing two ball plungers 72B and 65B is disclosed in this modified example, it is not necessarily to incorporate two ball plungers together. That is, in the gate valve according to the aforementioned embodiment, from the configuration providing the two ball plungers 72B and 65B, any one ball plunger may be adopted.

Additionally, in the case where a plurality of force-applying units A70 are disposed inside the valve box 10, a configuration in which "structure that causes compressive force to act with respect to the movable valve A (first structure)" shown in the above-mentioned embodiment and "structure that has both a function of causing compressive force to act with respect to the movable valve A and a function of causing tensile force to act with respect to the movable valve A60 (second structure)" shown in the above-mentioned modified example are alternately disposed may be adopted as the force-applying unit A70. Alternatively, a configuration in which the second structure is disposed between two first structures or a configuration in which the first structure is disposed between two second structures may be adopted.

INDUSTRIAL APPLICABILITY

In a vacuum apparatus or the like, the invention is widely applicable to a gate valve used for switching between: a state of isolating a flow passage that connects two spaces different from each other in characteristics such that a degree of vacuum, a temperature, or a gas atmosphere; and a state where the isolation state is released.

DESCRIPTION OF REFERENCE NUMERALS

5 . . . neutral valve body (valve body), 10, 10a, 10b . . . valve box, 10A, 10B . . . valve box inner surface, 11 . . . hollow portion, 12a . . . first opening portion, 12b . . . second opening portion, 20 . . . rotation shaft, 30 . . . neutral valve (arm), 30a . . . circular portion, 30b . . . rotation portion (arm), 40 . . . movable valve, 50 . . . movable valve B (second movable valve, movable valve plate: counter plate), 51 . . . second seal portion (counter cushion), 52 . . . third seal portion (slide sealing packing), 60 . . . movable valve A (first movable valve, movable valve frame: slide valve plate), 61 . . . first seal portion (valve plate sealing packing), 65 . . . position regulation portion, 65B . . . ball plunger, 70 . . . force-applying unit A (first force-applying unit, lifting and lowering mechanism), 71 . . . fixed portion, 72 . . . movable portion, 72B . . . ball plunger, 80 . . . force-applying unit B (second force-applying unit, holding spring), 81 . . . holding spring (guide) pin, 90 . . . force-applying unit C (third force-applying unit, auxiliary spring), 91 . . . auxiliary spring (pressure applying) pin, 100 . . . gate valve.

What is claimed is:

1. A gate valve, comprising:
   a valve box having a hollow portion, a first opening portion, and a second opening portion, the first opening portion and the second opening portion being provided so as to face each other with the hollow portion interposed therebetween and forming a flow passage passing through the hollow portion;
   a neutral valve body that is arranged in the hollow portion of the valve box and is capable of sealing the first opening portion; and
   a rotation shaft that functions as a position switcher that drives the neutral valve body between a valve sealing position at which the neutral valve body is in a state of sealing the first opening portion and a valve opening position at which the neutral valve body is in an open state of being retracted from the first opening portion, the rotation shaft having an axis line extending in a flow passage direction, wherein
   the neutral valve body comprises: a neutral valve connected to the position switcher; and a movable valve connected to the neutral valve so that a position thereof with respect to the neutral valve in the flow passage direction is changeable,
   the movable valve comprises a first movable valve and a second movable valve, the first movable valve including a seal portion that is provided thereon, is circumferentially provided on the movable valve, and is to be in close contact with a valve box inner surface located at a periphery of the first opening portion, the first movable valve being connected to the neutral valve so that a position thereof with respect to the neutral valve in the flow passage direction is changeable, the second movable valve being slidable relative to the first movable valve in the flow passage direction, and wherein the gate valve comprises:
   a plurality of first force-applying units built in the valve box;
   a second force-applying unit disposed between the first movable valve and the second movable valve; and
   a third force-applying unit disposed between the first movable valve and the neutral valve,
   the third force-applying unit connecting the first movable valve to the neutral valve such that a position thereof with respect to the neutral valve in the flow passage direction is changeable, wherein the third force-applying unit generates and applies a force to the first movable valve to be directed to a center position in the flow passage direction,
   the first force-applying units have a function of applying a force to the first movable valve to be directed to the first opening portion in the flow passage direction and thereby causing the seal portion to be in close contact with a valve box inner surface located at a periphery of the first opening portion, and
   the second force-applying unit drives the first movable valve and the second movable valve so that thicknesses thereof in the flow passage direction are adjustable.

2. The gate valve according to claim 1, wherein each of the first force-applying units is disposed at a position at which the first force-applying unit acts with respect to the first movable valve in the valve box and is provided along the first movable valve.

3. The gate valve according to claim 1, wherein the first force-applying units apply compressive force to the first movable valve.

4. The gate valve according to claim 1, wherein the third force-applying unit is a plate spring.

5. A gate valve comprising:
   a valve box having a hollow portion, a first opening portion, and a second opening portion, the first opening portion and the second opening portion being provided so as to face each other with the hollow portion interposed therebetween and forming a flow passage passing through the hollow portion;
   a neutral valve body that is arranged in the hollow portion of the valve box and is capable of sealing the first opening portion; and
   a rotation shaft that functions as a position switcher that drives the neutral valve body between a valve sealing position at which the neutral valve body is in a state of sealing the first opening portion and a valve opening position at which the neutral valve body is in an open state of being retracted from the first opening portion, the rotation shaft having an axis line extending in a flow passage direction, wherein
   the neutral valve body comprises:
   a neutral valve connected to the position switcher; and
   a movable valve connected to the neutral valve so that a position thereof with respect to the neutral valve in the flow passage direction is changeable,
   the movable valve comprises a first movable valve and a second movable valve, the first movable valve including a seal portion that is provided thereon, is circumferentially provided on the movable valve, and is to be in close contact with a valve box inner surface located at a periphery of the first opening portion, the first movable valve being connected to the neutral valve so that a position thereof with respect to the neutral valve in the flow passage direction is changeable, the second movable valve being slidable relative to the first movable valve in the flow passage direction, and wherein the gate valve comprises:
- a plurality of first force-applying units built in the valve box; and
- a second force-applying unit disposed between the first movable valve and the second movable valve, the first force-applying units have:
- a function of applying a force to the first movable valve to be directed to the first opening portion in the flow passage direction and thereby causing the seal portion to be in close contact with a valve box inner surface located at a periphery of the first opening portion; and
- a function of connecting the first movable valve to the neutral valve such that a position thereof with respect to the neutral valve in the flow passage direction is changeable and generating and applying a force to the first movable valve to be directed to a center position in the flow passage direction, and the second force-applying unit drives the first movable valve and the second movable valve so that thicknesses thereof in the flow passage direction are adjustable.

* * * * *